US00RE49040E

(19) United States
(12) Reissued Patent
Maeda

(10) Patent Number: US RE49,040 E
(45) **Date of Reissued Patent: *Apr. 19, 2022**

(54) LIGHT SOURCE APPARATUS AND IMAGE PROJECTION APPARATUS

(71) Applicant: Ricoh Company, Ltd., Tokyo (JP)

(72) Inventor: Ikuo Maeda, Kanagawa (JP)

(73) Assignee: Ricoh Company, Ltd., Tokyo (JP)

( * ) Notice: This patent is subject to a terminal disclaimer.

(21) Appl. No.: 16/688,229

(22) Filed: Nov. 19, 2019

Related U.S. Patent Documents

Reissue of:
(64) Patent No.: 8,974,064
Issued: Mar. 10, 2015
Appl. No.: 13/487,401
Filed: Jun. 4, 2012

U.S. Applications:
(60) Continuation of application No. 15/652,455, filed on Jul. 18, 2017, now Pat. No. Re. 47,778, which is a division of application No. 15/160,125, filed on May 20, 2016, now Pat. No. Re. 46,622, which is an application for the reissue of Pat. No. 8,974,064.

(30) Foreign Application Priority Data

Jun. 20, 2011 (JP) ..... 2011-136605
Dec. 28, 2011 (JP) ..... 2011-289717

(51) Int. Cl.
*G03B 21/16* (2006.01)
*G03B 21/20* (2006.01)

(52) U.S. Cl.
CPC ..... *G03B 21/16* (2013.01); *G03B 21/2013* (2013.01); *G03B 21/2033* (2013.01); *G03B 21/2066* (2013.01)

(58) Field of Classification Search
CPC ..... G03B 21/16; G03B 21/2066; G03B 21/2013; G03B 21/2033
USPC ..... 353/31, 33; 362/227, 249.01, 259, 341, 362/346, 373
See application file for complete search history.

(56) References Cited

U.S. PATENT DOCUMENTS 5,313,479 A 5/1994 Florence
7,506,985 B2 * 3/2009 Radominski et al. ..... 353/94
(Continued)

FOREIGN PATENT DOCUMENTS

EP 1 428 415 6/2004
EP 1 428 415 A1 6/2004
(Continued)

OTHER PUBLICATIONS

Extended European Search Report for 12169821.1 dated Oct. 11, 2012.
(Continued)

*Primary Examiner* — Kenneth Whittington
(74) *Attorney, Agent, or Firm* — IPUSA, PLLC

(57) ABSTRACT

A light source apparatus includes a light source unit that includes plural sets of a laser and a coupling lens corresponding to the laser, which are circumferentially provided to form a circle; and a reflecting unit placed within the circle and provided with plural reflecting surfaces corresponding to the lasers of the plural sets of the light source unit to be formed in a cone shape, the light irradiated from each of the lasers being injected into the corresponding reflecting surface via the corresponding coupling lens.

8 Claims, 22 Drawing Sheets

(56) References Cited

U.S. PATENT DOCUMENTS

| | | | | |
|---|---|---|---|---|
| 2002/0030995 | A1 | 3/2002 | Shoji | |
| 2003/0147055 | A1 | 8/2003 | Yokoyama | |
| 2004/0090602 | A1 | 5/2004 | Imade | |
| 2004/0207818 | A1 | 10/2004 | Stahl | |
| 2005/0013132 | A1 | 1/2005 | Kim et al. | |
| 2005/0024602 | A1* | 2/2005 | Shimaoka | H04N 9/315 353/94 |
| 2005/0062937 | A1 | 3/2005 | Imade et al. | |
| 2005/0128730 | A1 | 6/2005 | Shindoh | |
| 2005/0200812 | A1 | 9/2005 | Sakata et al. | |
| 2006/0114420 | A1 | 6/2006 | Kim et al. | |
| 2006/0227086 | A1 | 10/2006 | Lyst, Jr. et al. | |
| 2006/0239006 | A1 | 10/2006 | Chaves et al. | |
| 2007/0153547 | A1 | 7/2007 | Liu | |
| 2008/0157678 | A1 | 7/2008 | Ito et al. | |
| 2008/0170392 | A1* | 7/2008 | Speier et al. | 362/227 |
| 2009/0040467 | A1 | 2/2009 | Yamauchi et al. | |
| 2009/0196045 | A1* | 8/2009 | Shuai et al. | 362/294 |
| 2010/0073638 | A1 | 3/2010 | Yagyu | |
| 2010/0165298 | A1 | 7/2010 | Imade | |
| 2012/0320585 | A1 | 12/2012 | Lin et al. | |

FOREIGN PATENT DOCUMENTS

| | | | |
|---|---|---|---|
| JP | 2002-270005 | | 9/2002 |
| JP | 2003-107400 | | 4/2003 |
| JP | 2003-347595 | | 12/2003 |
| JP | 2005-140847 | | 6/2005 |
| JP | 2005-283818 | | 10/2005 |
| JP | 2005-292642 | | 10/2005 |
| JP | 2006-293125 | | 10/2006 |
| JP | 2007-065600 | * | 3/2007 |
| JP | 2007-065600 | A | 3/2007 |
| JP | 2007-183642 | | 7/2007 |
| JP | 2008-004644 | | 1/2008 |
| JP | 2008 004644 | A | 1/2008 |
| JP | 4055809 | | 3/2008 |
| JP | 2009-523308 | | 6/2009 |
| JP | 2010-078622 | | 4/2010 |
| JP | 4477571 | | 6/2010 |
| JP | 2010-151870 | | 7/2010 |
| JP | 2010 151870 | A | 7/2010 |
| JP | 2011-043703 | | 3/2011 |
| KR | 2006-0081027 | * | 7/2006 |
| WO | 2010/138190 | | 12/2010 |

OTHER PUBLICATIONS

European Office Action for 12169821.1 dated May 16, 2013.
Japanese Office Action for 2016-084218 dated May 16, 2017.
European Office Action for 12169821.1 dated Mar. 6, 2018.
Japanese Office Action for 2018-181883 dated Nov. 13, 2018.
Japanese Office Action for 2018-181883 dated Jan. 8, 2019.
Kinoshita; JP 2008/004644 A; Jan. 10, 2008; Machine Translation in English.*

* cited by examiner

LIGHT SOURCE APPARATUS AND IMAGE PROJECTION APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for U.S. application Ser. No. 13/487,401, now U.S. Pat. No. 8,974,064. U.S. application Ser. No. 15/652,455, U.S. application Ser. No. 15/160,125, and this reissue application are reissue applications of U.S. Pat. No. 8,974,064. This reissue application is a continuation reissue application of U.S. application Ser. No. 15/652,455, filed Jul. 18, 2017, which is a divisional reissue of U.S. application Ser. No. 15/160,125, filed on May 20, 2016, which is an application for reissue of U.S. Pat. No. 8,974,064.*

BACKGROUND OF THE INVENTION

1. Field of the Invention

The present invention relates to a light source apparatus and an image projection apparatus including the light source apparatus for projecting an enlarged image.

2. Description of the Related Art

Recently, there has been proposed to use a laser as a light source for an image projection apparatus such as a projector or the like. A commercially available rear projector where a laser is used as the light source is provided, for example. For a front projector, a laser is used in combination with a fluorescent material as the light source has been actualized because of a problem of speckling in a projected image or the like.

When using a laser as the sole light source of the image projection apparatus, repeatability of color, luminous efficacy, efficiency of utilization of light or the like can be improved. Further, as the laser is a point light source (or a parallel beam), it is easy to design the optical system, mixing of colors is easy, and the number of apertures (Numerical Aperture (NA)) of a projector lens in the image projection apparatus can be reduced.

Here, when solely using the laser as the light source of the image projection apparatus, it is an important problem to obtain sufficient amount of light. In order to solve this problem, examples where plural lasers are densely placed in a matrix form or in two-dimensional form on a plane are provided (Patent Document 1 and Patent Document 2, for example).

However, if plural lasers are densely provided, there is another problem with how efficiently those lasers are cooled. By densely providing the large number of lasers, the size of the image projection apparatus can be reduced. However, in such a case, it becomes more difficult to radiate heat so that a cooling unit with a larger power may be necessary. On the other hand, in order to efficiently cool the lasers, the lasers may be provided with longer intervals to each other. However, in such a case, the size of the image projection apparatus becomes larger as well as the incident angles of the lights to be injected into a rod integrator of the image projection apparatus may become larger so that an optical system may not function well.

PATENT DOCUMENT

[Patent Document 1] Japanese Patent No. 4,055,809
[Patent Document 2] Japanese Patent No. 4,477,571

SUMMARY OF THE INVENTION

The present invention is made in light of the above problems, and provides a light source apparatus, and an image projection apparatus including the light source apparatus for projecting an enlarged image capable of using plural lasers as a light source while improving the heat radiation.

According to an embodiment, there is provided a light source apparatus including a light source unit that includes plural sets of a laser and a coupling lens corresponding to the laser, which are circumferentially provided to form a circle; and a reflecting unit placed within the circle and provided with plural reflecting surfaces corresponding to the lasers of the plural sets of the light source unit to be formed in a cone shape, the light irradiated from each of the lasers being injected into the corresponding reflecting surface via the corresponding coupling lens.

According to another embodiment, there is provided an image projection apparatus including the above light source apparatus; an amount of light equation unit that equates the amount of the lights reflected by the reflecting surfaces of the reflecting unit of the light source apparatus; a light transmission optical system that transmits the lights output from the amount of light equation unit to an image forming panel which forms an image; and a projection optical system that projects an enlarged image of the image formed on the image forming panel.

Note that also arbitrary combinations of the above-described constituents, and any exchanges of expressions in the present invention, made among method, device, system and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

Figure 1:
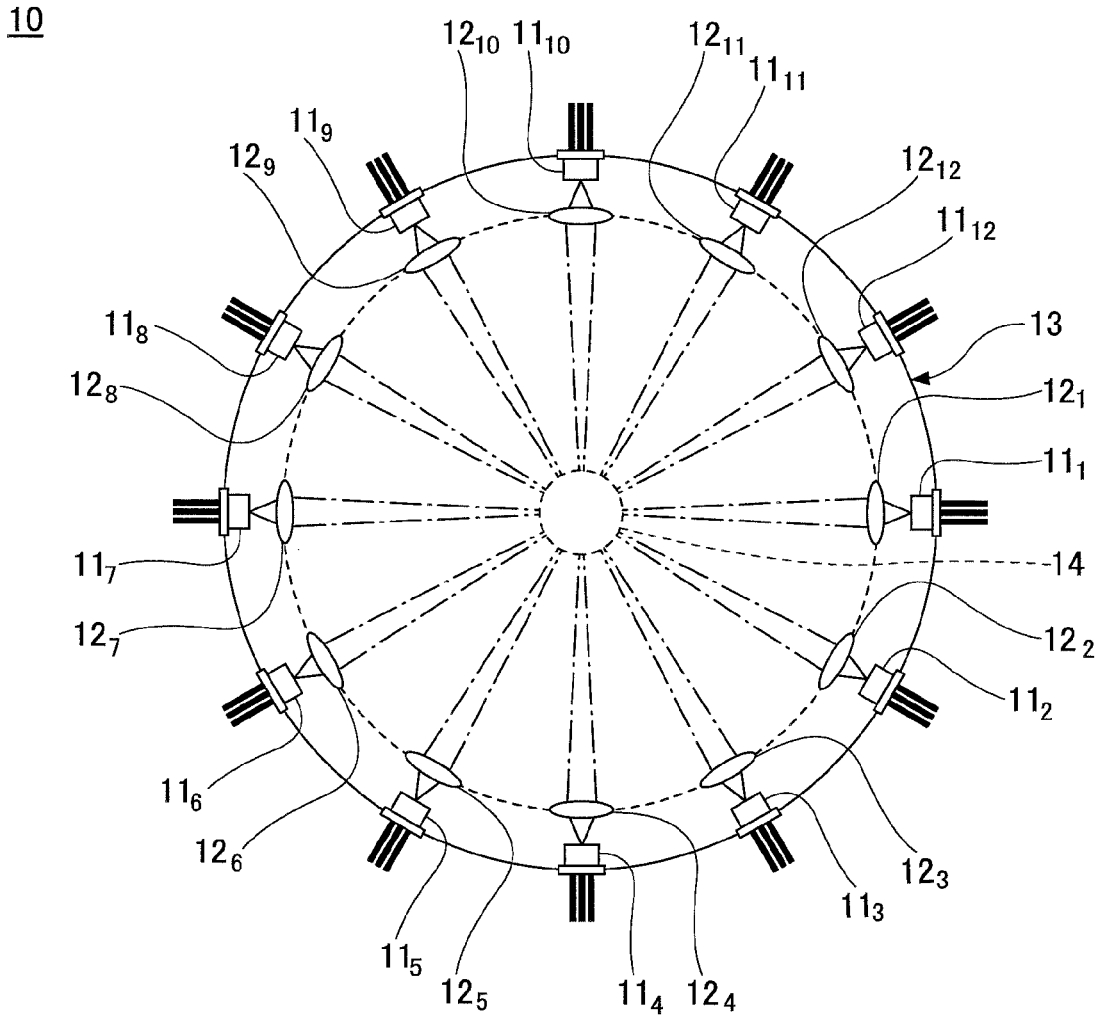
FIG. 1 is a partial plan view showing an example of an image projection apparatus of a first embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

First Embodiment

Figure 2:
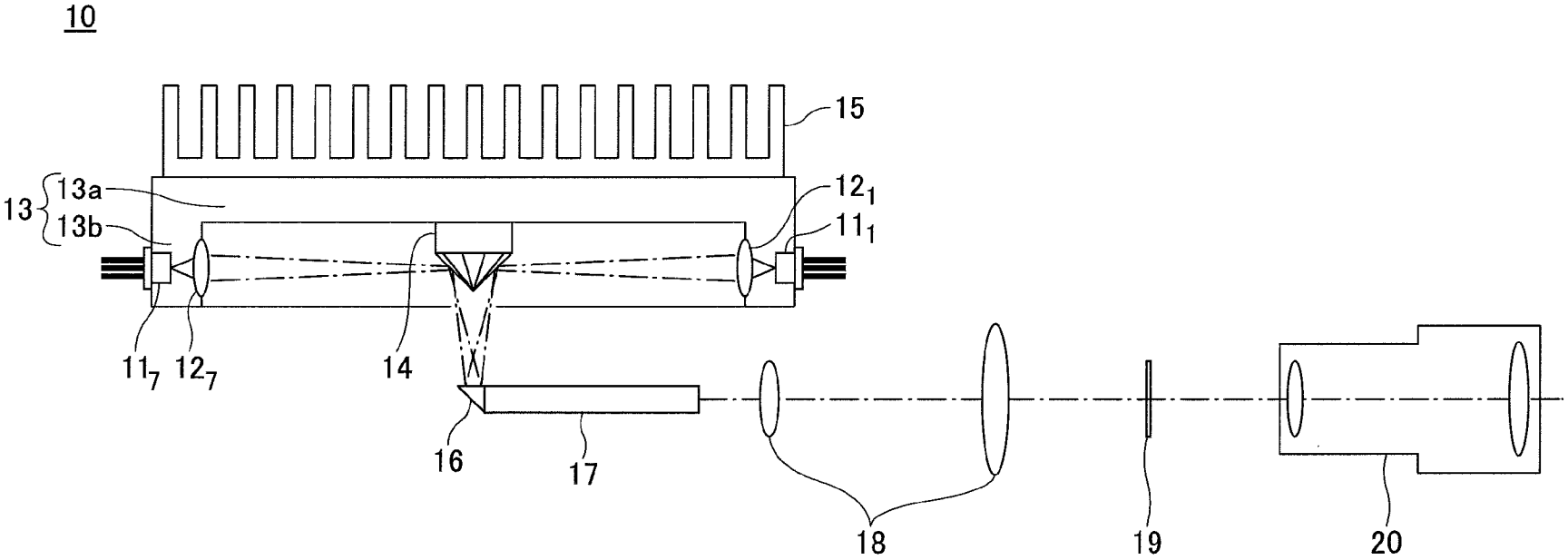
FIG. 2 is a schematic view showing an example of the image projection apparatus of the first embodiment.

FIG. 1 is a partial plan view showing an example of an image projection apparatus 10 of the first embodiment. FIG. 2 is a schematic view showing an example of the image projection apparatus 10 of the first embodiment.

With reference to FIG. 1 and FIG. 2, the image projection apparatus 10 includes plural light sources $\mathbf{11}_1$ to $\mathbf{11}_{12}$, plural coupling lenses $\mathbf{12}_1$ to $\mathbf{12}_{12}$, a support member 13, a reflecting unit 14, a radiation member 15, a reflecting prism 16, a rod integrator 17, a relay lens 18, an image forming panel 19 and a projector lens 20. Here, the structure composed by the plural light sources $\mathbf{11}_1$ to $\mathbf{11}_{12}$, the plural coupling lenses $\mathbf{12}_1$ to $\mathbf{12}_{12}$ and the reflecting unit 14 is an example of a "light source apparatus".

Further, the radiation member 15, the reflecting prism 16, the rod integrator 17, the relay lens 18, the image forming panel 19 and the projector lens 20 shown in FIG. 2 are not shown in FIG. 1. Further, in FIG. 1, the light sources $\mathbf{11}_1$ to $\mathbf{11}_{12}$ and the coupling lenses $\mathbf{12}_1$ to $\mathbf{12}_{12}$ are shown by solid lines for explanation.

The light sources $\mathbf{11}_1$ to $\mathbf{11}_{12}$ are, for example, lasers such as semiconductor lasers or the like, respectively. In this embodiment, the colors of the lights irradiated from the light sources $\mathbf{11}_1$ to $\mathbf{11}_{12}$ may be the same or may be different. The coupling lenses $\mathbf{12}_1$ to $\mathbf{12}_{12}$ are convex lenses made of glass or plastics, for example, respectively. Hereinafter, the structure composed by the light sources $\mathbf{11}_1$ to $\mathbf{11}_{12}$ and the coupling lenses $\mathbf{12}_1$ to $\mathbf{12}_{12}$ are referred to as a "first light source unit" as well.

The support member 13 includes a flat plate 13a and a side wall 13b. The flat plate 13a has a substantially circular shape in a planar view. The side wall 13b has a substantially annular shape and is provided at a peripheral portion of one surface of the flat plate 13a to stand in a direction substantially perpendicular to the one surface of the flat plate 13a. The support member 13 is made of, for example, a metal such as aluminum or the like, a mold resin or the like. The flat plate 13a and the side wall 13b may be integrally formed, or may be separately formed and attached with each other.

The light sources $\mathbf{11}_1$ to $\mathbf{11}_{12}$ are provided in the side wall 13b of the support member 13 at substantially even intervals along the circumference of the support member 13 such that the lights are irradiated toward the substantial center of the flat plate 13a of the support member 13. Further, the coupling lenses $\mathbf{12}_1$ to $\mathbf{12}_{12}$, respectively corresponding to the light sources $\mathbf{11}_1$ to $\mathbf{11}_{12}$, are also provided in the side wall 13b of the support member 13 at substantially even intervals along the circumference of the support member 13. The coupling lenses $\mathbf{12}_1$ to $\mathbf{12}_{12}$ are provided at an inner side of the corresponding light sources $\mathbf{11}_1$ to $\mathbf{11}_{12}$. The distance between the adjacent light sources among the light sources $\mathbf{11}_1$ to $\mathbf{11}_{12}$ may be arbitrary determined by selecting the size of the support member 13, and may be about 10 to 15 mm, for example.

The reflecting unit 14 is provided at the substantial center portion of the flat plate 13a of the support member 13. The reflecting unit 14 is formed to have a cone or pyramid shape provided with plural reflecting surfaces reflecting the lights irradiated from the light sources $\mathbf{11}_1$ to $\mathbf{11}_{12}$, respectively. In other words, each of the reflecting surfaces of the reflecting unit 14 is provided at a position where the light irradiated from the corresponding light source $\mathbf{11}_1$ to $\mathbf{11}_{12}$ via the corresponding coupling lens $\mathbf{12}_1$ to $\mathbf{12}_{12}$ is injected. The reflecting unit 14 is, for example, made of a glass. The reflecting surfaces may be formed by depositing an aluminum layer or the like, for example.

The radiation member 15 is provided at the other surface of the flat plate 13a of the support member 13 (the surface where the side wall 13b is not formed). Here, the radiation member 15 may be provided in accordance with necessity.

The lights irradiated from the light sources $\mathbf{11}_1$ to $\mathbf{11}_{12}$ pass through the respective coupling lenses $\mathbf{12}_1$ to $\mathbf{12}_{12}$ and become beams substantially parallel in relationship with each other in a slight condensed state. The lights passed through the coupling lenses $\mathbf{12}_1$ to $\mathbf{12}_{12}$ are reflected by the reflecting surfaces of the reflecting unit 14 so that their optical paths are changed to be injected into the reflecting prism 16, respectively. Alternatively, a reflecting mirror may be used instead of the reflecting prism 16. Here, the lights reflected by the reflecting surfaces of the reflecting unit 14 are directed to substantially the same direction.

The lights injected into the reflecting prism 16 are further reflected by the reflecting prism 16 so that their optical paths are changed again to be injected into the rod integrator 17. Then, reflection is repeatedly performed within the rod integrator 17 where the colors of the lights are mixed, and the amount of each of the lights is also equalized to be ejected from the rod integrator 17. The lights ejected from the rod integrator 17 are irradiated on the image forming panel 19 by the relay lens 18 and then projected onto an external screen (not shown in the drawings) by the projector lens 20. In this embodiment, the image forming panel 19 is a transmission panel that forms an image in accordance with a modulating signal. Alternatively, a reflection panel or a digital micro mirror device (DMD) may be used as the image forming panel 19.

The rod integrator 17 is an example of an "amount of light equation unit". Alternatively, instead of the rod integrator 17, an optical system that condenses injected lights using plural lenses may be used as the amount of light equation unit. Further, the relay lens 18 is an example of a "light transmission optical system". Further, the projector lens 20 is an example of a "projection optical system".

By using the rod integrator 17, the structure of the image projection apparatus 10 may be simplified. For example, by positional errors or the like of the light sources and the coupling lenses or errors in adjusting angles of mirrors, there may be a case where the positions of the ejected lights are shifted from the designation. This problem may be solved by providing adjusting units on optical paths of the lights. However, as the image projection apparatus 10 includes the plural light sources, the number of the necessary adjusting units also becomes larger to increase the cost. However, by providing the rod integrator 17 and further having the size of an input portion of the rod integrator 17 made larger, plural lights can be injected into the rod integrator 17 without the adjustment.

The image projection apparatus 10 may further include a diffusion panel at an input portion of the rod integrator 17 in order to improve the equation of the amount of lights at an output portion of the rod integrator 17. However, in this case, it should be noted that the angle of each of the lights ejected from the rod integrator 17 becomes larger.

As described above, according to the image projection apparatus 10 of the first embodiment, plural sets of the laser (light source) and the coupling lens corresponding to the laser (light source) are circumferentially provided. Thus, the space between the adjacent lasers can be set longer, to reduce mutual heat interference with each other. Further, by providing the lasers irradiating lights of different colors to be adjacent, the mutual heat interference can be further reduced. Further, by fixing the plural lasers in the single support member, it is easy to provide the radiation member (heat sink) on the support member, so that air can easily pass through around the lasers. Further, the size of the support member can be arbitrary set, and therefore, the heat capacity of the support member can be increased by adjusting the size, it is possible to radiate heat to the support member.

Further, the size (radius) for the circle along which the plural lasers are placed can also be arbitrary set. Therefore, the number of the lasers can also be set arbitrary. Further, the number of lasers for each of the colors can also be set arbitrary. Further, as the radiation of the heat is minimal, the lasers with larger output (power) can be selected.

Further, incident angles of the lights injected into the rod integrator can be made smaller, so that, the cross-sectional area of the rod integrator can be formed smaller. Therefore, spreading of the lights of the image forming panel can be suppressed, and a projector lens with smaller NA (larger F value) can be used. Therefore, it becomes more easily to design or manufacture the projector lens and image quality can also be easily improved.

Further, the lights of plural colors can be mixed without using dichroic mirrors (or, a dichroic prism).

In other words, according to the embodiment, a light source apparatus, and an image projection apparatus including the light source apparatus for projecting an enlarged image capable of using plural lasers as a light source while improving the heat radiation are provided.

Further, the image projection apparatus of the first embodiment is applicable to various needs as the image projection apparatus has the various merits as described above, and is capable of being designed arbitrary. The image projection apparatus 10 of the first embodiment may be applicable to a projector.

Alternative Example 1 of the First Embodiment

In an alternative example 1 of the first embodiment, the plural light sources and the corresponding plural coupling lenses are provided to be inclined with respect to the one surface of the flat plate of the support member. In the alternative example 1 of the first embodiment, explanation of the same components which are already explained is not repeated.

Figure 3:
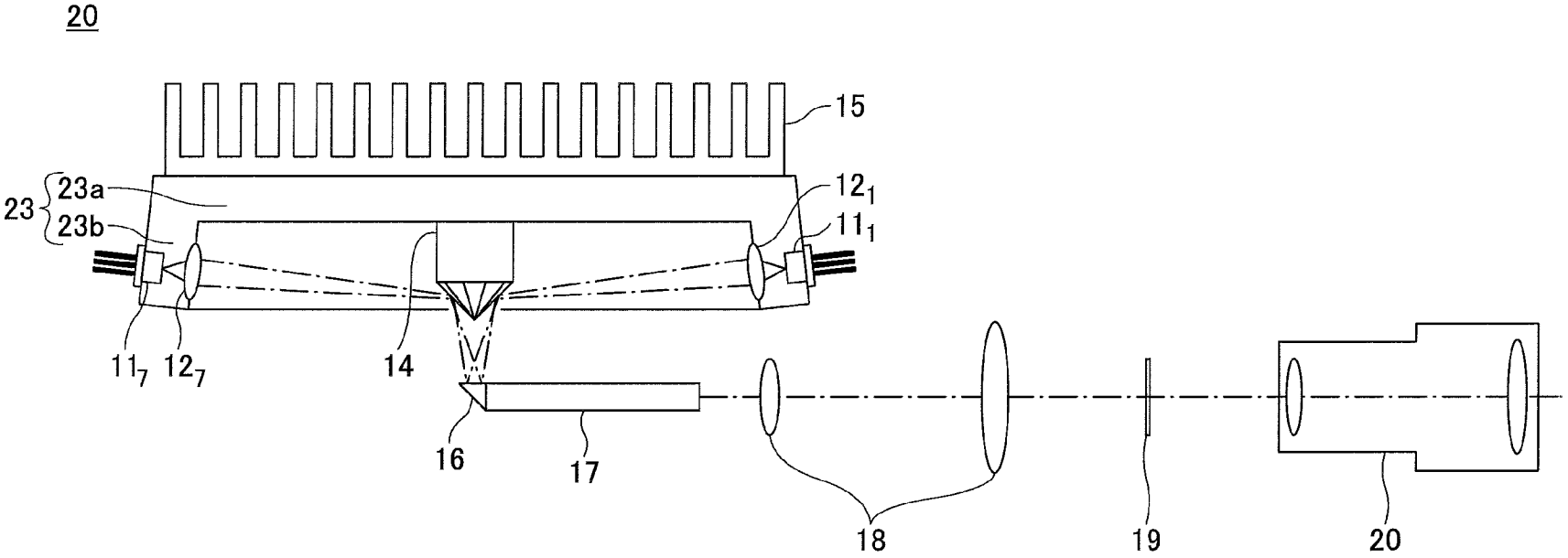
FIG. 3 is a schematic view showing an example of an image projection apparatus of an alternative example 1 of the first embodiment.

FIG. 3 is a schematic view showing an example of an image projection apparatus 20 of the alternative example 1 of the first embodiment. With reference to FIG. 3, the image projection apparatus 20 is different from the image projection apparatus 10 (see FIG. 1 and FIG. 2) in that the support member 13 is substituted by a support member 23.

The support member 23 includes a flat plate 23a and a side wall 23b. The flat plate 23a has a substantially circular shape in a planar view. The side wall 23b has a substantially annular shape and is provided at the peripheral portion of one surface of the flat plate 23a. The support member 23 is made of, for example, a metal such as aluminum or the like, a mold resin or the like. The flat plate 23a and the side wall 23b may be integrally formed, or may be separately formed and attached with each other.

For the support member 13 explained with reference to FIG. 1 and FIG. 2, the side wall 13b is provided at the peripheral portion of the one surface of the flat plate 13a to stand in the direction substantially perpendicular to the surface of the flat plate 13a. However, for the support member 23, the side wall 23b is provided at the peripheral portion of the one surface of the flat plate 23a to be inclined with respect to the one surface of the flat plate 23a in an expanding manner. In this example as well, the light sources $\mathbf{11}_1$ to $\mathbf{11}_{12}$ and the coupling lenses $\mathbf{12}_1$ to $\mathbf{12}_{12}$ are provided in the side wall 23b of the support member 23. In this case, the light sources $\mathbf{11}_1$ to $\mathbf{11}_{12}$ and the coupling lenses $\mathbf{12}_1$ to $\mathbf{12}_{12}$ are placed to be inclined with respect to the one surface of the flat plate 23a such that the lights irradiated from the light sources $\mathbf{11}_1$ to $\mathbf{11}_{12}$ and passed through the corresponding coupling lenses $\mathbf{12}_1$ to $\mathbf{12}_{12}$ proceed in a direction inclined with respect to the one surface of the flat plate 23a of the support member 23 to be farther from the one surface of the flat plate 23a as they proceed.

Here, alternatively, for the support member 23, the side wall 23b may be provided at the peripheral portion of the one surface of the flat plate 23a to stand in the direction substantially perpendicular to the one surface of the flat plate 23a, similar to the support member 13 shown in FIG. 2. However, only the light sources $\mathbf{11}_1$ to $\mathbf{11}_{12}$ and the coupling lenses $12_1$ to $12_{12}$ may be provided to be inclined with respect to the one surface of the flat plate 23a.

As described in this example, the optical axes of the lights irradiated from the light sources $11_1$ to $11_{12}$ and passed through the corresponding coupling lenses $12_1$ to $12_{12}$ may not necessarily be in a parallel relationship with the one surface of the flat plate 23a, and may be inclined with respect to the one surface of the flat plate 23a. Even for this structure, the merits same as those of the first embodiment can be obtained.

Alternative Example 2 of the First Embodiment

In an alternative example 2 of the first embodiment, plural light source units are provided. In the alternative example 2 of the first embodiment, explanation of the same components which are already explained is not repeated.

Figure 4:
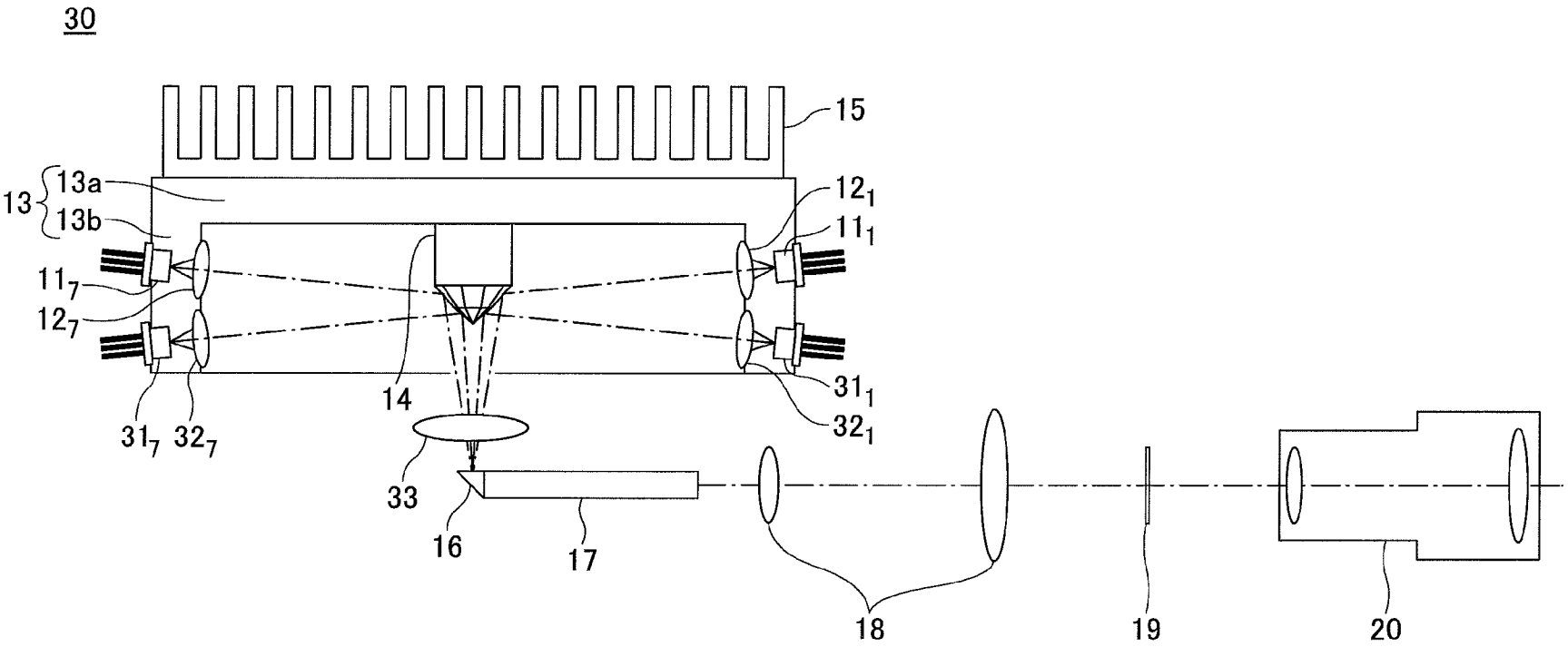
FIG. 4 is a schematic view showing an example of an image projection apparatus of an alternative example 2 of the first embodiment.

FIG. 4 is a schematic view showing an example of an image projection apparatus 30 of the alternative example 2 of the first embodiment. With reference to FIG. 4, the image projection apparatus 30 is different from the image projection apparatus 10 (see FIG. 1 and FIG. 2) in that two light source units, a first light source unit and a second light source unit, are provided at the support member 13 positioned in two levels.

Further, the image projection apparatus 30 further includes a condenser lens 33 provided on optical paths between the reflecting unit 14 and the reflecting prism 16. The first light source unit includes the light sources $11_1$ to $11_{12}$ and the coupling lenses $12_1$ to $12_{12}$. The second light source unit includes light sources $31_1$ to $31_{12}$ and coupling lenses $32_1$ to $32_{12}$ respectively corresponding to the light sources $31_1$ to $31_{12}$.

The structure composed by the plural light sources $11_1$ to $11_{12}$ and $31_1$ to $31_{12}$, the plural coupling lenses $12_1$ to $12_{12}$ and $32_1$ to $32_{12}$, and the reflecting unit 14 is an example of the light source apparatus.

The light sources $31_1$ to $31_{12}$ are, for example, lasers such as semiconductor lasers or the like, respectively. In this embodiment, the colors of the irradiated lights from the light sources $31_1$ to $31_{12}$ may be the same or may be different. The coupling lenses $32_1$ to $32_{12}$ are convex lenses made of glass or plastics, for example, respectively.

The light sources $31_1$ to $31_{12}$ may be placed to overlap the light sources $11_1$ to $11_{12}$ in a planar view. Further, the coupling lenses $32_1$ to $32_{12}$ may be placed to overlap the coupling lenses $12_1$ to $12_{12}$ in a planar view.

In this example, the light sources $11_1$ to $11_{12}$ and the coupling lenses $12_1$ to $12_{12}$ are placed above the light sources $31_1$ to $31_{12}$ and the coupling lenses $32_1$ to $32_{12}$, respectively.

In this example, the light sources $11_1$ to $11_{12}$ and the coupling lenses $12_1$ to $12_{12}$ are attached to the side wall 13b of the support member 13 to be inclined with respect to the one surface of the flat plate 13a directing toward a direction opposite to the one surface of the flat plate 13a. With this structure, the lights irradiated from the light sources $11_1$ to $11_{12}$ and passed through the coupling lenses $12_1$ to $12_{12}$ proceed in a direction inclined with respect to the one surface of the flat plate 13a of the support member 13 to be farther from the one surface of the flat plate 13a.

The light sources $31_1$ to $31_{12}$ and the coupling lenses $32_1$ to $32_{12}$ are also attached to the side wall 13b of the support member 13 to be inclined with respect to the one surface of the flat plate 13a toward a direction opposite to that of the light sources $11_1$ to $11_{12}$ and the coupling lenses $12_1$ to $12_{12}$. With this structure, the lights irradiated from the light sources $31_1$ to $31_{12}$ and passed through the coupling lenses $32_1$ to $32_{12}$ proceed in a direction inclined with respect to the one surface of the flat plate 13a of the support member 13 to be closer to the one surface of the flat plate 13a.

With the above structure, the lights irradiated from the light sources $11_1$ to $11_{12}$ and passed through the coupling lenses $12_1$ to $12_{12}$, and the lights irradiated from the light sources $31_1$ to $31_{12}$ and passed through the coupling lenses $32_1$ to $32_{12}$ are gathered to be injected into the respective reflecting surfaces of the reflecting unit 14.

The lights reflected by the reflecting surfaces of the reflecting unit 14 are injected into the reflecting prism 16 via the condenser lens 33. Then, similar to the first embodiment, the lights are projected on the external screen (not shown in the drawings) via the rod integrator 17, the relay lens 18, the image forming panel 19, and the projector lens 20. Here, as described above, the light sources $11_1$ to $11_{12}$ and the light sources $31_1$ to $31_{12}$ are attached to be inclined with respect to the one surface of the flat plate 13a. Therefore, there may be a case that incident angles of the lights injected into the rod integrator 17 become larger after being reflected by the reflecting surfaces of the reflecting unit 14 and passing through the reflecting prism 16. Therefore, the condenser lens 33 is provided to decrease the incident angles of the lights injected into the rod integrator 17. Thus, when desired incident angles can be obtained without using the condenser lens 33, it is not necessary to provide the condenser lens 33.

In the example shown in FIG. 4, the light sources $11_1$ to $11_{12}$ and the light sources $31_1$ to $31_{12}$ are positioned to overlap in a planar view in two levels, and the coupling lenses $12_1$ to $12_{12}$ and the coupling lenses $32_1$ to $32_{12}$ are also positioned to overlap in a planar view in two levels. However, alternatively, an example as shown in FIG. 5 may be used.

Figure 5:
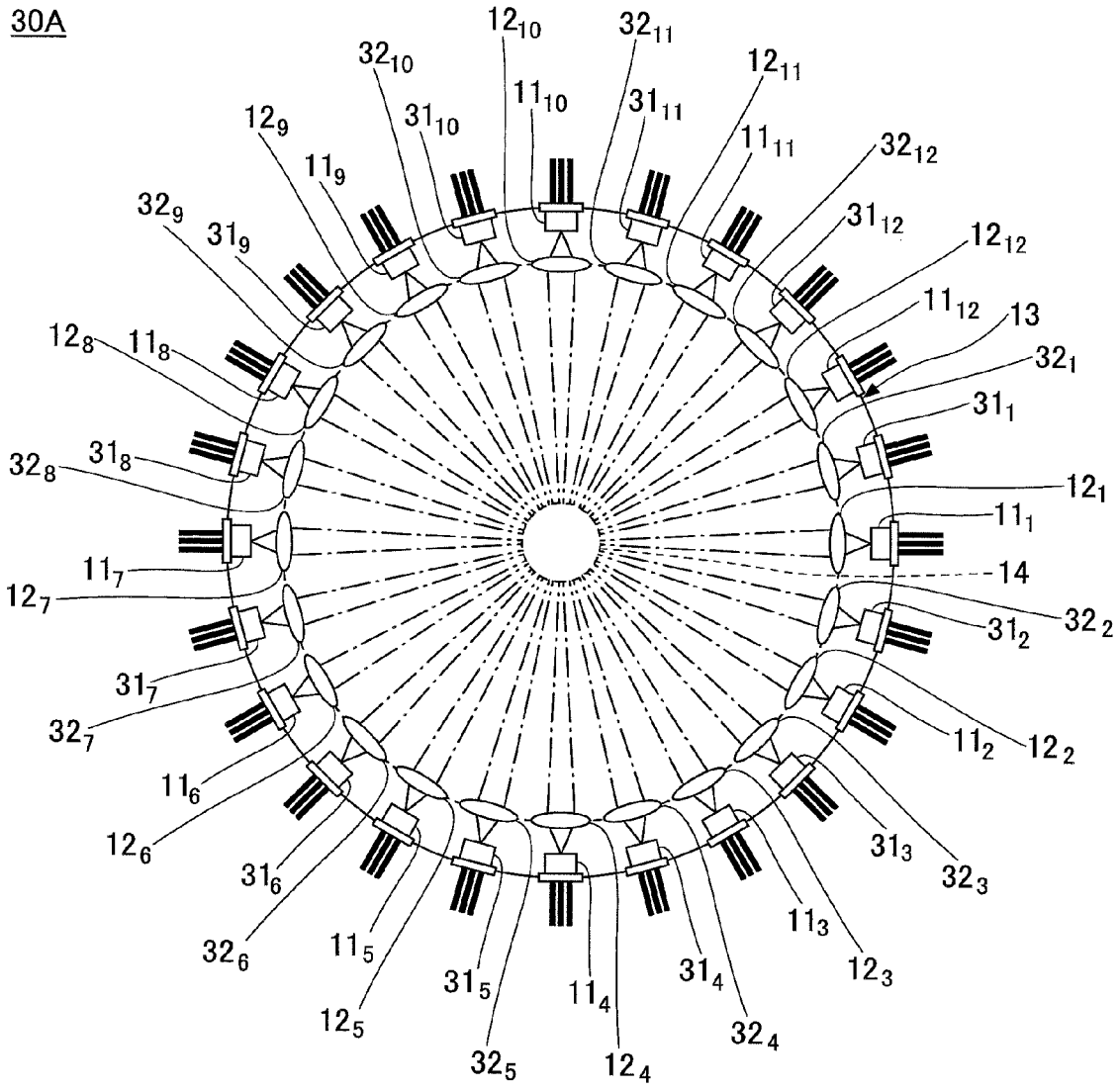
FIG. 5 is a partial plan view showing another example of an image projection apparatus of the alternative example 2 of the first embodiment.

FIG. 5 is a partial plan view showing another example of an image projection apparatus 30A of the alternative example 2 of the first embodiment. The radiation member 15, the reflecting prism 16, the rod integrator 17, the relay lens 18, the image forming panel 19, the projector lens 20 and the condenser lens 33 shown in FIG. 4 are not shown in FIG. 5. Further, in FIG. 5, the light sources $11_1$ to $11_{12}$, the coupling lenses $12_1$ to $12_{12}$, the light sources $31_1$ to $31_{12}$ and the coupling lenses $32_1$ to $32_{12}$ are shown by solid lines for explanation.

With reference to FIG. 5, similar to the image projection apparatus 30, the image projection apparatus 30A includes the two light source units, the first light source unit and the second light source unit positioned in two levels. However, different from the image projection apparatus 30, in the image projection apparatus 30A, the light sources $11_1$ to $11_{12}$ and the light sources $31_1$ to $31_{12}$ are alternately positioned in a planar view. In other words, the light sources $11_1$ to $11_{12}$ and the light sources $31_1$ to $31_{12}$ are positioned not to overlap but at the different positions. Further, similar to the light sources $11_1$ to $11_{12}$ and the light sources $31_1$ to $31_{12}$, the coupling lenses $12_1$ to $12_{12}$ and the coupling lenses $32_1$ to $32_{12}$ are alternately positioned (at different positions) in a planar view.

By alternately positioning the light sources $11_1$ to $11_{12}$ and the light sources $31_1$ to $31_{12}$ in a planar view (at different positions), the mutual heat interference between the light sources $11_1$ to $11_{12}$ and the light sources $31_1$ to $31_{12}$ can be further reduced.

Further, the image projection apparatus 30 or the image projection apparatus 30A respectively shown in FIG. 4 and FIG. 5 may include three or more light source units provided in three or more levels. Further, the number of sets of the light source and the coupling lens included in each of the light source units may not be the same, and may be different for each of the light source units.

As described above, according to the alternative example 2 of the first embodiment, the merits same as those of the first embodiment can be obtained. Further, by providing the plural light source units in the corresponding plural levels and condensing the irradiated lights, a larger amount of light can be obtained compared with the first embodiment.

Alternative Example 3 of the First Embodiment

In an alternative example 3 of the first embodiment, the lights reflected by the reflecting surfaces of the reflecting unit are directly introduced into the rod integrator 17. In the alternative example 3 of the first embodiment, explanation of the same components which are already explained is not repeated.

Figure 6:
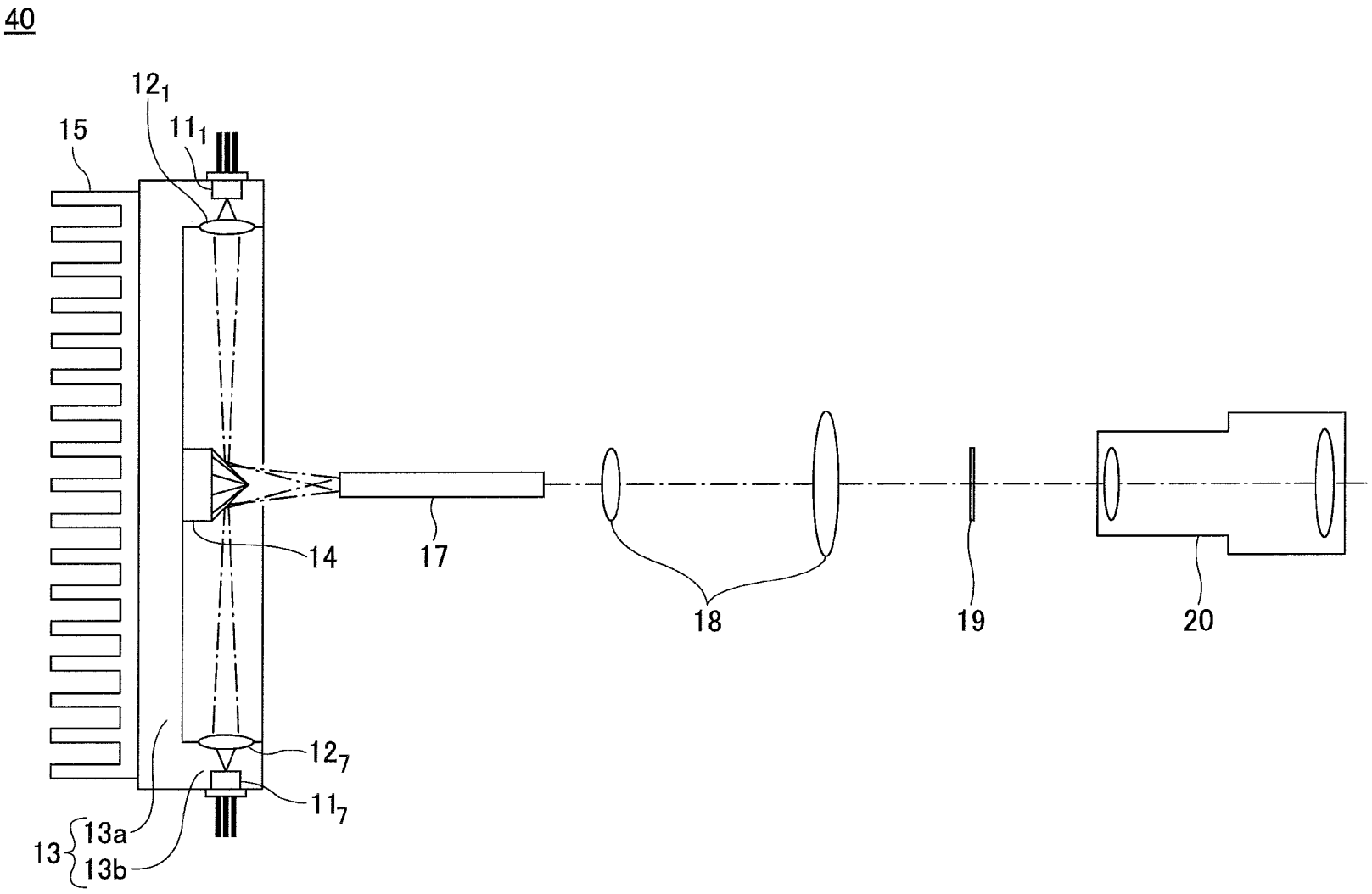
FIG. 6 is a schematic view showing an example of an image projection apparatus of an alternative example 3 of the first embodiment.

FIG. 6 is a schematic view showing an example of an image projection apparatus 40 of the alternative example 3 of the first embodiment. With reference to FIG. 6, the image projection apparatus 40 is different from the image projection apparatus 10 (see FIG. 1 and FIG. 2) in that the reflecting prism 16 is not included.

As shown in FIG. 6, the reflecting prism 16 may not be provided and the lights reflected by the reflecting surfaces of the reflecting unit 14 may be directly introduced into the rod integrator 17. Even with this structure, the merits same as those of the first embodiment can be obtained.

Alternative Example 4 of the First Embodiment

In an alternative example 4 of the first embodiment, the plural light source units are provided to face each other. In the alternative example 4 of the first embodiment, explanation of the same components which are already explained is not repeated.

Figure 7:
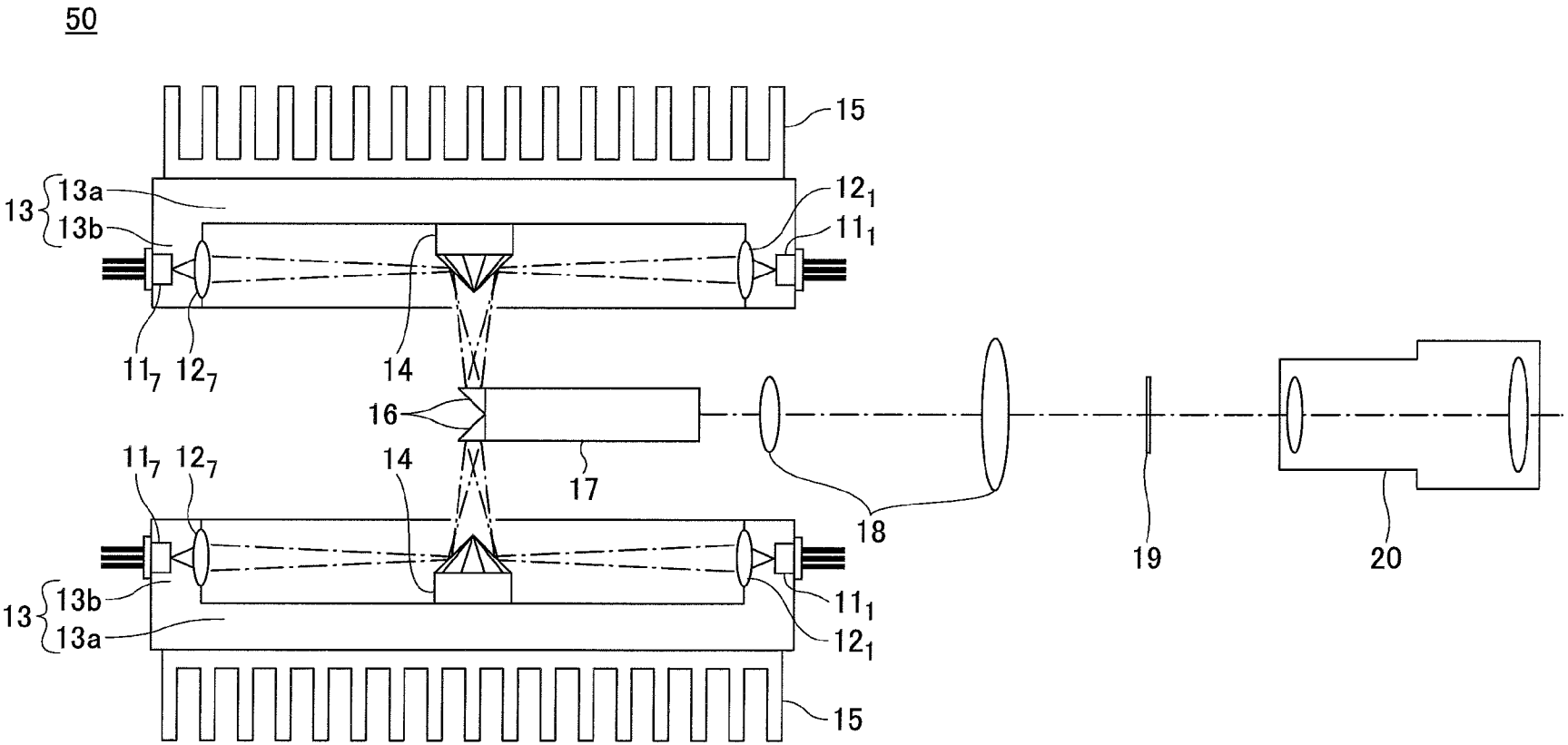
FIG. 7 is a schematic view showing an example of an image projection apparatus of an alternative example 4 of the first embodiment.

FIG. 7 is a schematic view showing an example of an image projection apparatus 50 of the alternative example 4 of the first embodiment. With reference to FIG. 7, the image projection apparatus 50 includes two sets of the light sources $\mathbf{11}_1$ to $\mathbf{11}_{12}$, the coupling lenses $\mathbf{12}_1$ to $\mathbf{12}_{12}$, the support member 13, the reflecting unit 14 and the radiation member 15 which are provided to face each other while the radiation members 15 are positioned at outer sides. Further, in this example, the reflecting prism 16 is also provided to be in two parts corresponding to the reflecting units 14 of the sets, respectively. The lights reflected by the reflecting surfaces of the reflecting unit 14 of each of the sets, are injected into the respective part of the reflecting prism 16. Then, the lights injected into the reflecting prism 16 are further reflected by the reflecting prism 16 so that their optical paths are changed again to be injected into the rod integrator 17. Then, similar to the first embodiment, the lights are projected on the external screen (not shown in the drawings) after passing through the relay lens 18, the image forming panel 19 and the projector lens 20.

Figure 8:
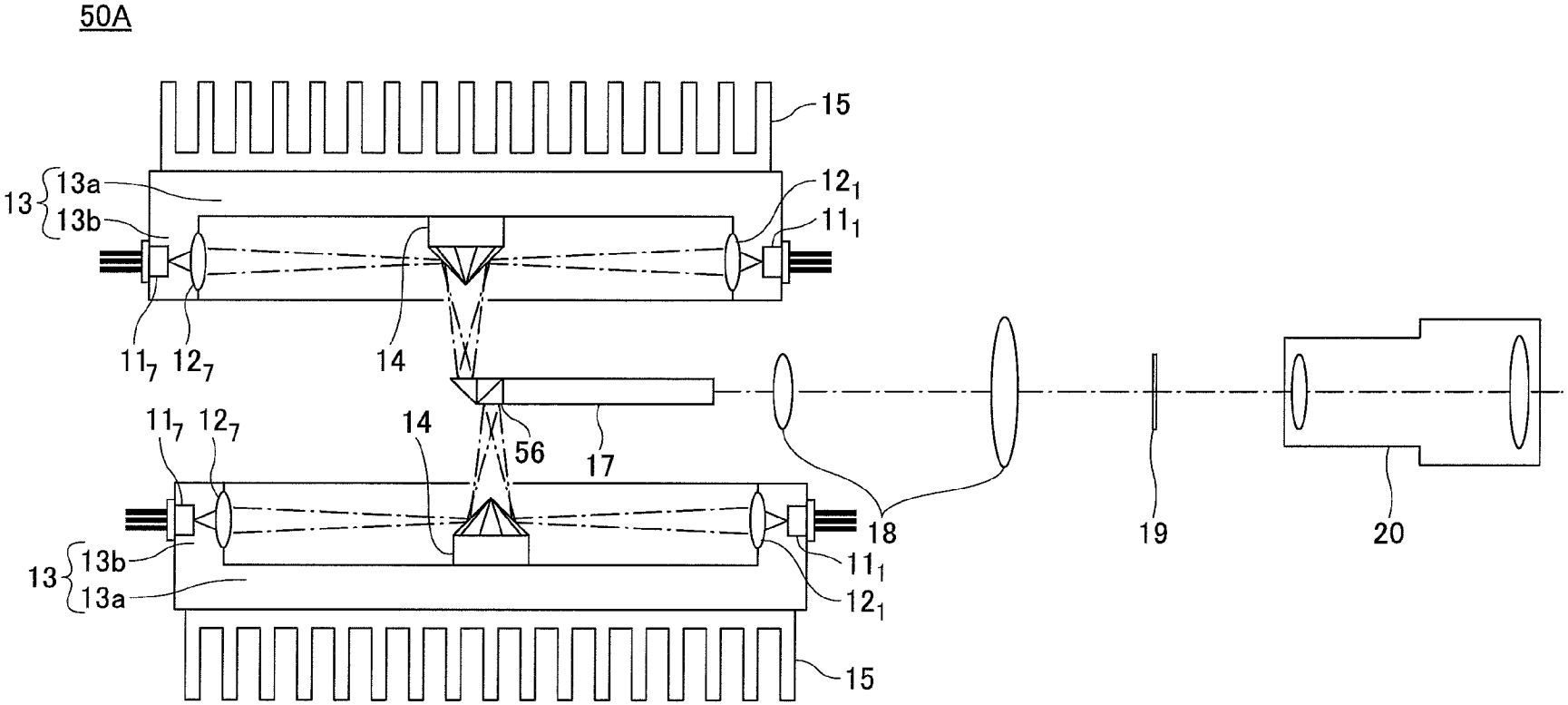
FIG. 8 is a schematic view showing another example of an image projection apparatus of an alternative example 4 of the first embodiment.

Further, FIG. 8 is a schematic view showing another example of an image projection apparatus 50A of the alternative example 4 of the first embodiment. With reference to FIG. 8, the image projection apparatus 50A is different from the image projection apparatus 50 (see FIG. 7) in that a dichroic prism 56 is further provided to condense the colors of the lights. The dichroic prism 56 is an optical element that condenses the lights of red (R), green (G), blue (B) or the like injected from different directions to direct to a single direction.

For the examples shown in FIG. 7 and FIG. 8, the lights injected into the rod integrator 17 are directed in substantially the same direction. However, the directions of the lights injected into the rod integrator 17 may be shifted with each other in order to promote injection into the rod integrator 17 or equation of the lights.

According to the alternative example 4 of the first embodiment, the merits same as those of the first embodiment can be obtained. Further, the following merit can be obtained. By providing the plural light source units to face each other, and condensing the irradiated lights, a larger amount of light can be obtained compared with the first embodiment.

Alternative Example 5 of the First Embodiment

In an alternative example 5 of the first embodiment, a tapered rod integrator is used. In the alternative example 5 of the first embodiment, explanation of the same components which are already explained is not repeated.

Figure 9:
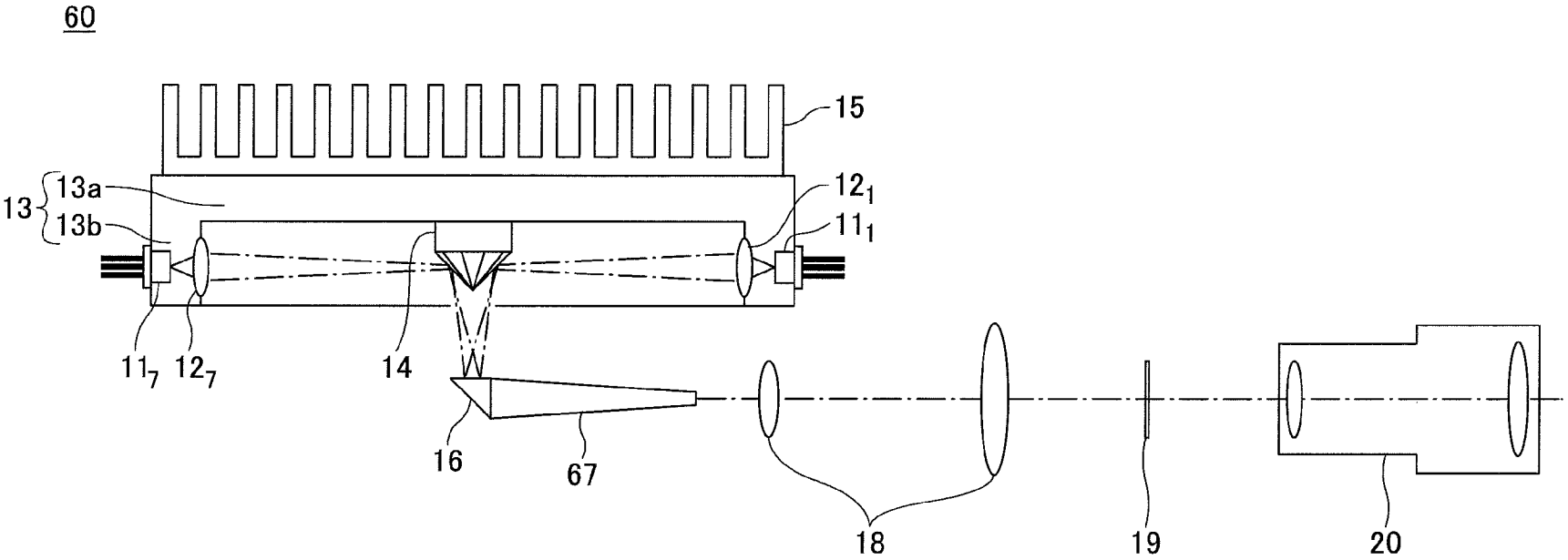
FIG. 9 is a schematic view showing an example of an image projection apparatus of an alternative example 5 of the first embodiment.

FIG. 9 is a schematic view showing an example of an image projection apparatus 60 of the alternative example 5 of the first embodiment. With reference to FIG. 9, the image projection apparatus 60 is different from the image projection apparatus 10 (see FIG. 1 and FIG. 2) in that the rod integrator 17 is substituted by a tapered rod integrator 67. The tapered rod integrator 67 is an example of the amount of light equation unit.

According to the alternative example 5 of the first embodiment, the merits same as those of the first embodiment can be obtained. Further, the following merit can be obtained. By using the tapered rod integrator, the injection of the lights or the mixing of the lights can be improved.

Alternative Example 6 of the First Embodiment

In an alternative example 6 of the first embodiment, an example where a reduction in speckle (fleck pattern) generated by the mutual interference of the irradiated lights is shown. In the alternative example 6 of the first embodiment, explanation of the same components which are already explained is not repeated.

Figure 10:
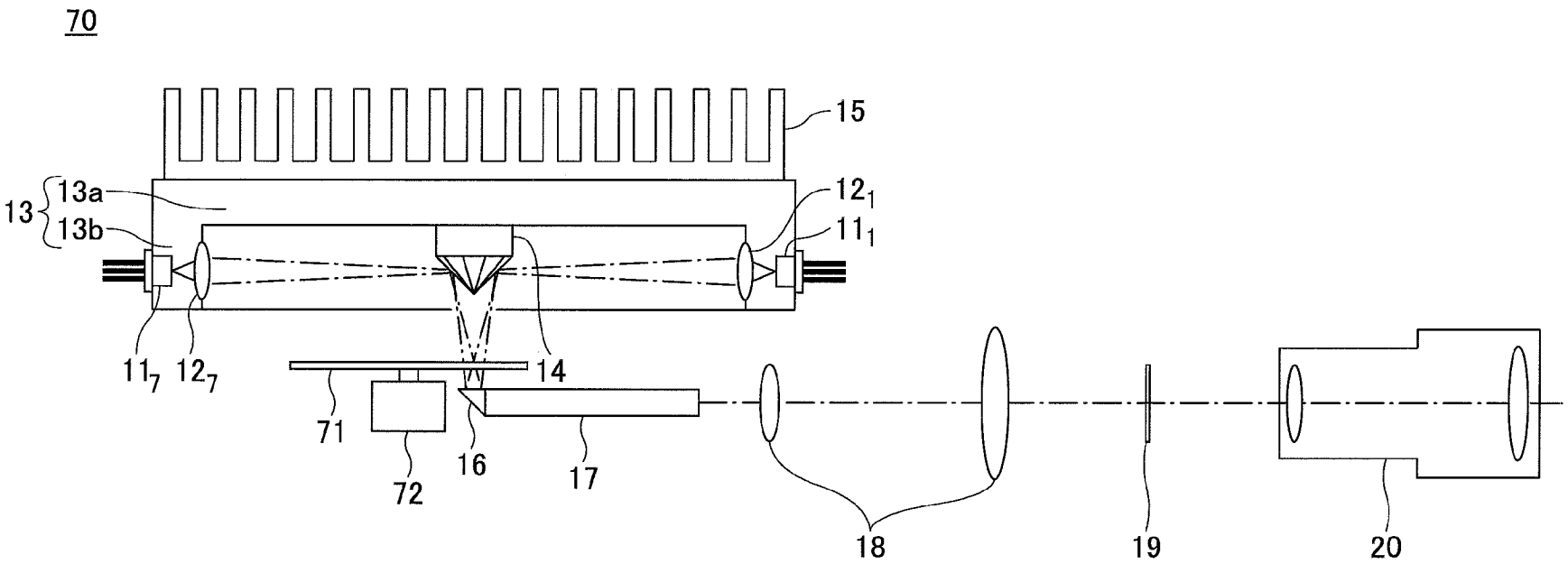
FIG. 10 is a schematic view showing an example of an image projection apparatus of an alternative example 6 of the first embodiment.

FIG. 10 is a schematic view showing an example of an image projection apparatus 70 of the alternative example 6 of the first embodiment. With reference to FIG. 10, the image projection apparatus 70 is different from the image projection apparatus 10 (see FIG. 1 and FIG. 2) in that a diffusion panel 71 and a motor 72 are added.

The diffusion panel 71 has a circular shape, for example, and the center portion of which is connected to the motor 72 to be rotated by the motor 72. The diffusion panel 71 is positioned such that its outer peripheral portion is positioned on an optical path between the reflecting unit 14 and the reflecting prism 16. For the diffusion panel 71, for example, a frosted glass, an opal glass, a diffractive optical element, a hologram element of the like may be used. The diffusion panel 71 and the motor 72 are examples of a "diffusion unit".

Figure 11:
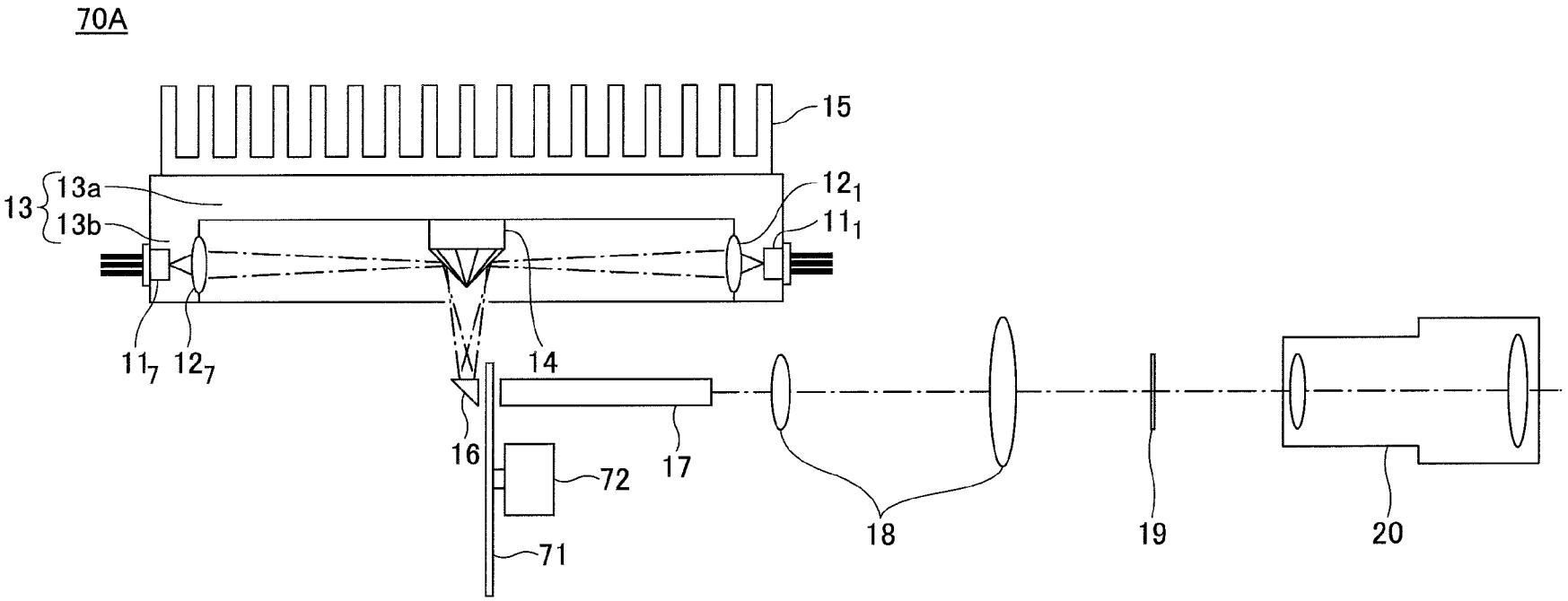
FIG. 11 is a schematic view of an image projection apparatus of an alternative example 6 of the first embodiment.

Further, FIG. 11 is a schematic view of an image projection apparatus 70A of the alternative example 6 of the first embodiment. With reference to FIG. 11, the image projection apparatus 70A is different from the image projection apparatus 70 (see FIG. 10) in that the diffusion panel 71 is positioned such that its outer peripheral portion is positioned on an optical path between the reflecting prism and the rod integrator 17.

According to the alternative example 6 of the first embodiment, the merits same as those of the first embodiment can be obtained. Further, the following merit can also be obtained. By placing the diffusion panel to be perpendicular to an optical path of the irradiated lights in the image projection apparatus and rotating the diffusion panel, the irradiated lights are diffused by the diffusion panel, so that speckling (fleck pattern) can be reduced.

Alternative Example 7 of the First Embodiment

In an alternative example 7 of the first embodiment, another example to reduce the speckling (fleck pattern) generated by the mutual interference of the irradiated lights is shown. In the alternative example 7 of the first embodiment, explanation of the same components which are already explained is not repeated.

Figure 12:
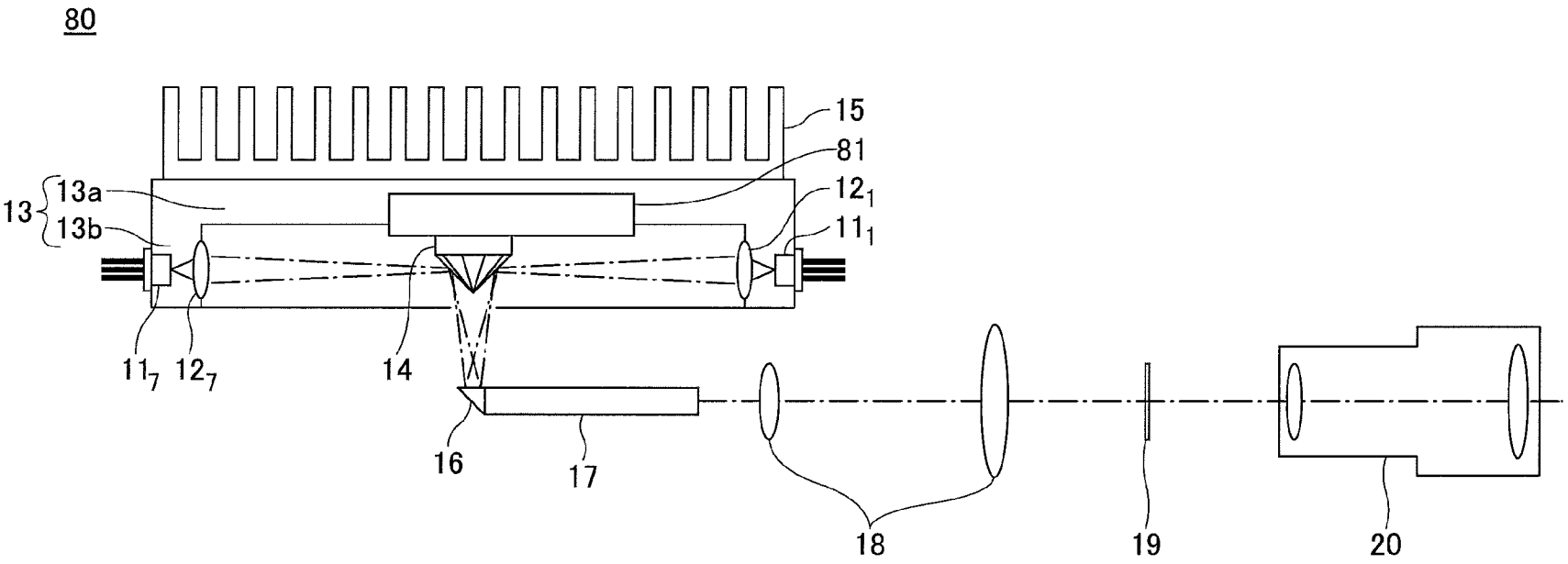
FIG. 12 is a schematic view showing an example of an image projection apparatus of an alternative example 7 of the first embodiment.

FIG. 12 is a schematic view showing an example of an image projection apparatus 80 of the alternative example 7 of the first embodiment. With reference to FIG. 12, the image projection apparatus 80 is different from the image projection apparatus 10 (see FIG. 1 and FIG. 2) in that a reflecting unit driving unit 81 is added.

The reflecting unit driving unit 81 has a function to rotate or oscillate the reflecting unit 14. For example, the reflecting unit driving unit 81 may have a function to rotate the reflecting unit 14 with respect to an axis substantially perpendicular to the flat plate 13a of the support member 13. Alternatively, the reflecting unit driving unit 81 may have a function to oscillate the reflecting unit 14 in a direction substantially in a parallel relationship with the flat plate 13a of the support member 13. The reflecting unit driving unit 81 may be actualized by a known component using a motor, a gear, a cam or the like. The structure composed by the reflecting unit 14 and the reflecting unit driving unit 81 is an example of the diffusion unit.

Here, it is not necessary to add an optical element or component for the case when the oscillation amount of the reflecting unit 14 by the reflecting unit driving unit 81 is small. However, when the oscillation amount becomes larger (for example, displacing approximately a few mm) or when the reflecting unit driving unit 81 is configured to rotate the reflecting unit 14, in order to maintain the amount of light, a structure such as a condenser lens may be provided on an optical path between the reflecting unit 14 and the reflecting prism 16 or the like may be adopted. When the amount of light is sufficient, by synchronizing the movement of the reflecting unit 14 and the illumination of the light sources $\mathbf{11}_1$ to $\mathbf{11}_{12}$, it is not necessary to add an optical element or component.

According to the alternative example 7 of the first embodiment, the same merits as those of the first embodiment can be obtained. Further, the following merit can be obtained. By rotating or oscillating the reflecting unit, the irradiated lights are diffused at the reflecting unit so that speckling (fleck pattern) can be reduced. Further, it is not necessary to provide a component for preventing speckling such as a diffusion panel or the like.

Second Embodiment

In a second embodiment, an example where plural light sources are provided while having their optical axes directed to the thickness direction of the support member is explained. In the second embodiment, explanation of the same components which are already explained is not repeated.

Figure 13:
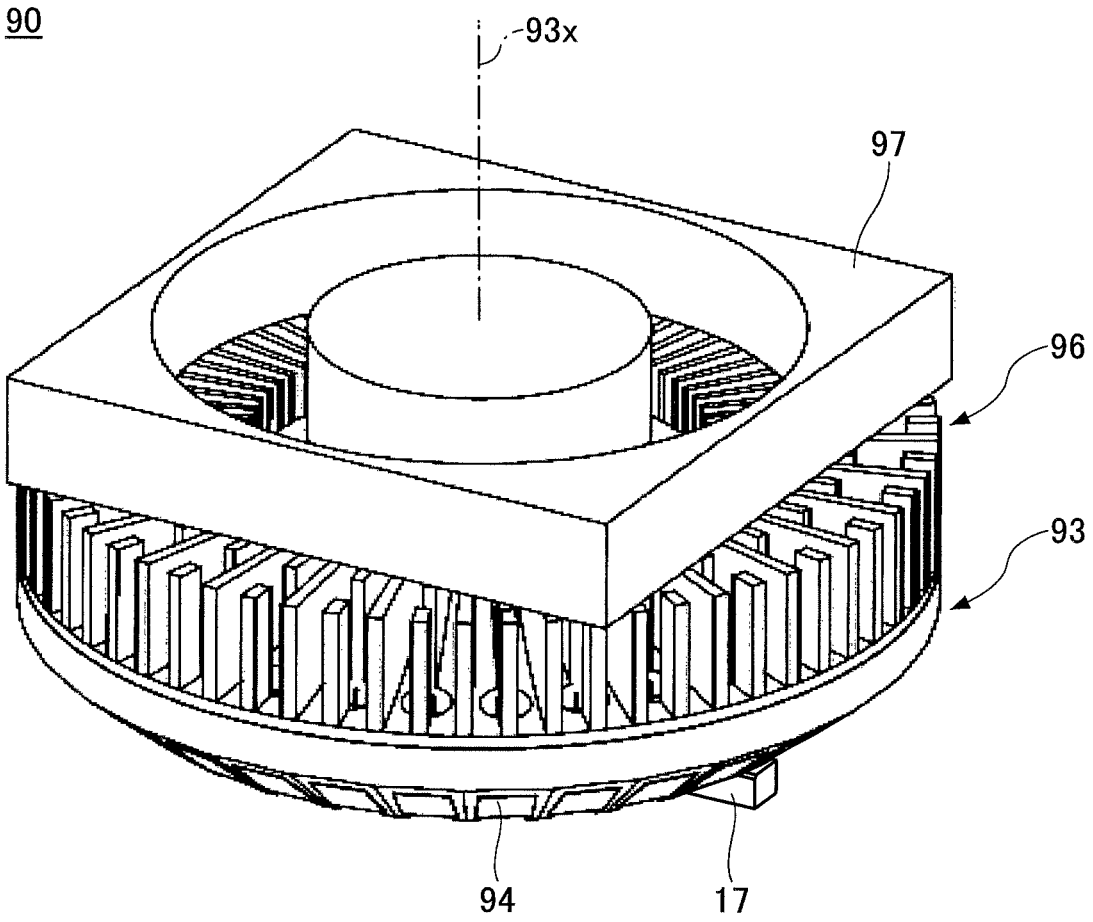
FIG. 13 is a perspective view showing an example of an image projection apparatus of a second embodiment.
Figure 14:
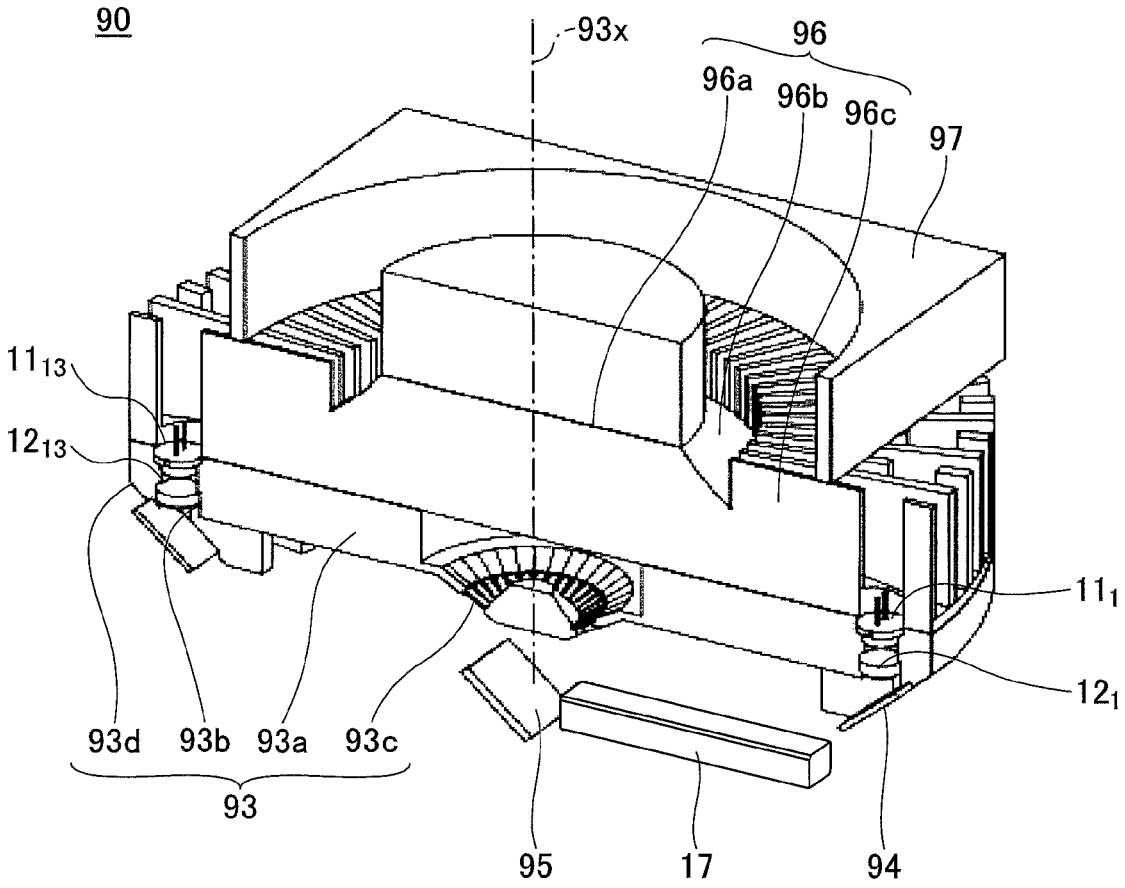
FIG. 14 is a cross-sectional perspective view showing the image projection apparatus of the second embodiment.
Figure 15:
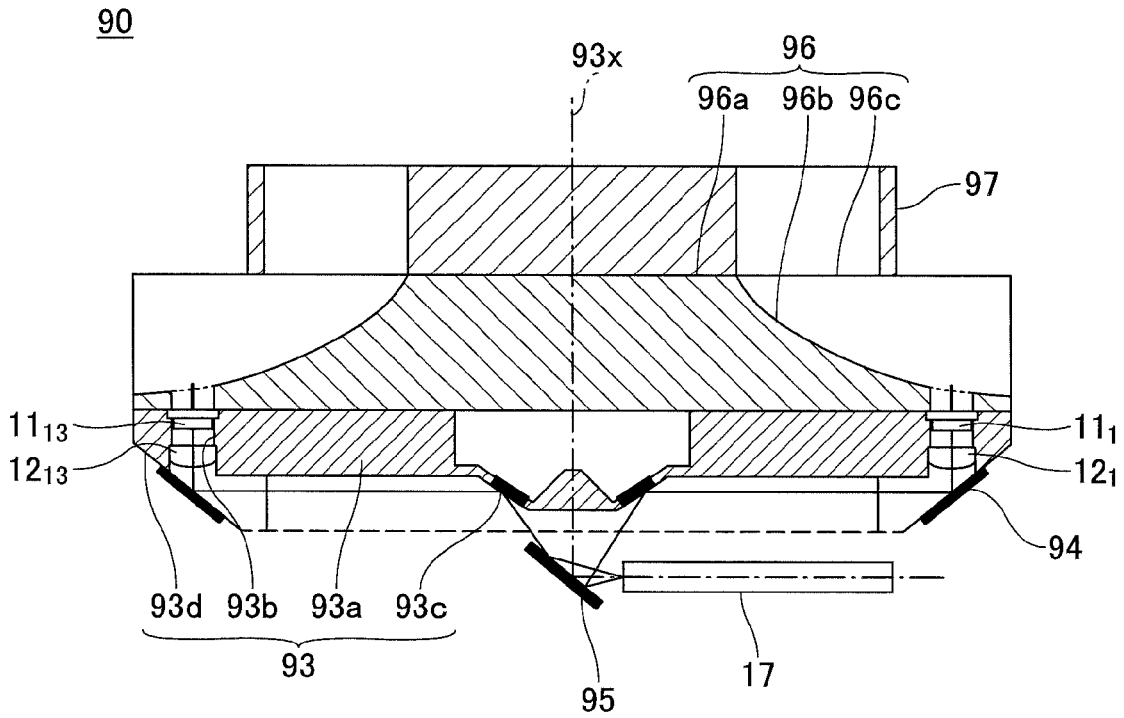
FIG. 15 is a cross-sectional view showing an example of the image projection apparatus of the second embodiment.
Figure 16:
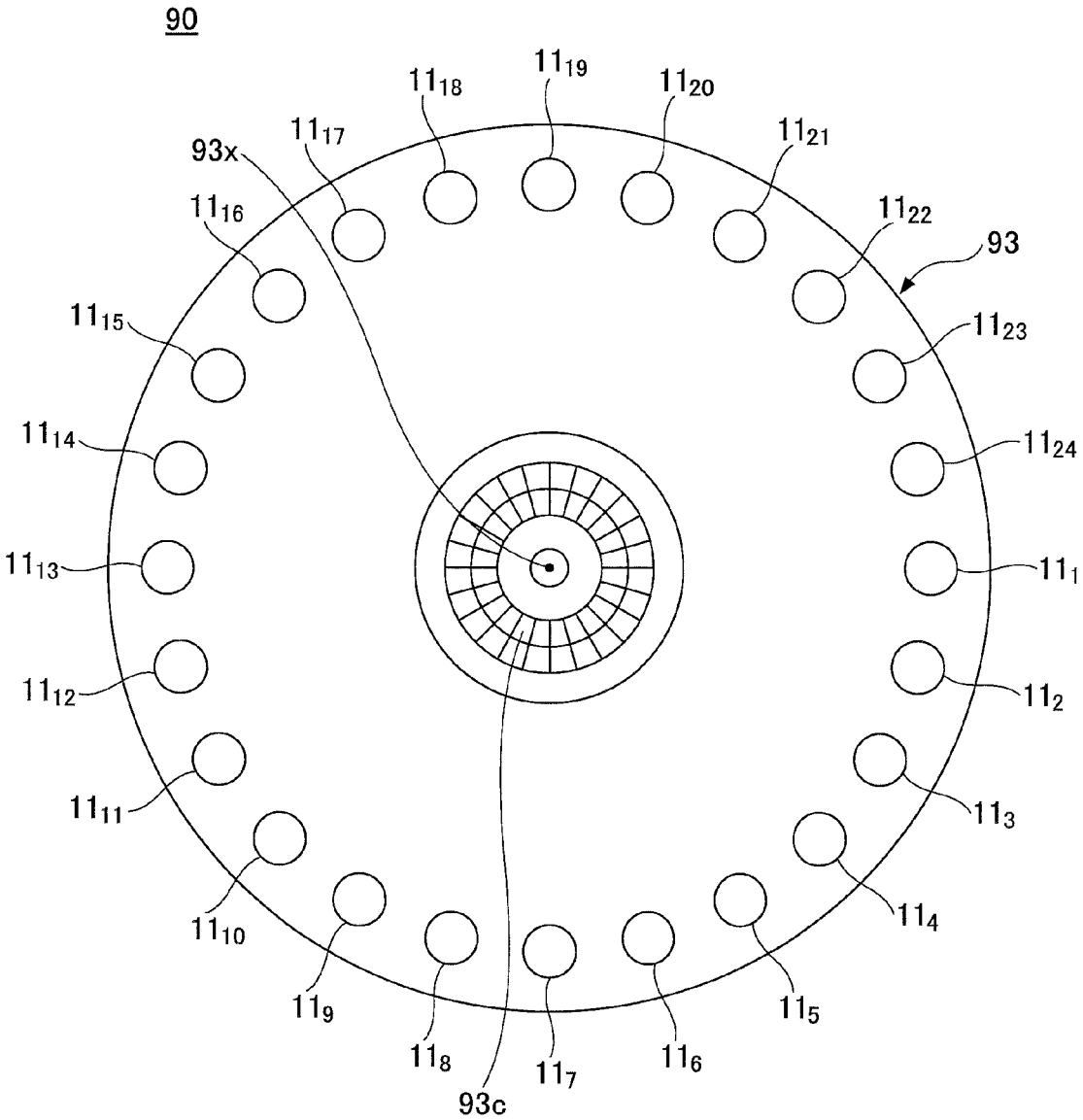
FIG. 16 is a partial plan view showing an example of the image projection apparatus of the second embodiment.
Figure 17:
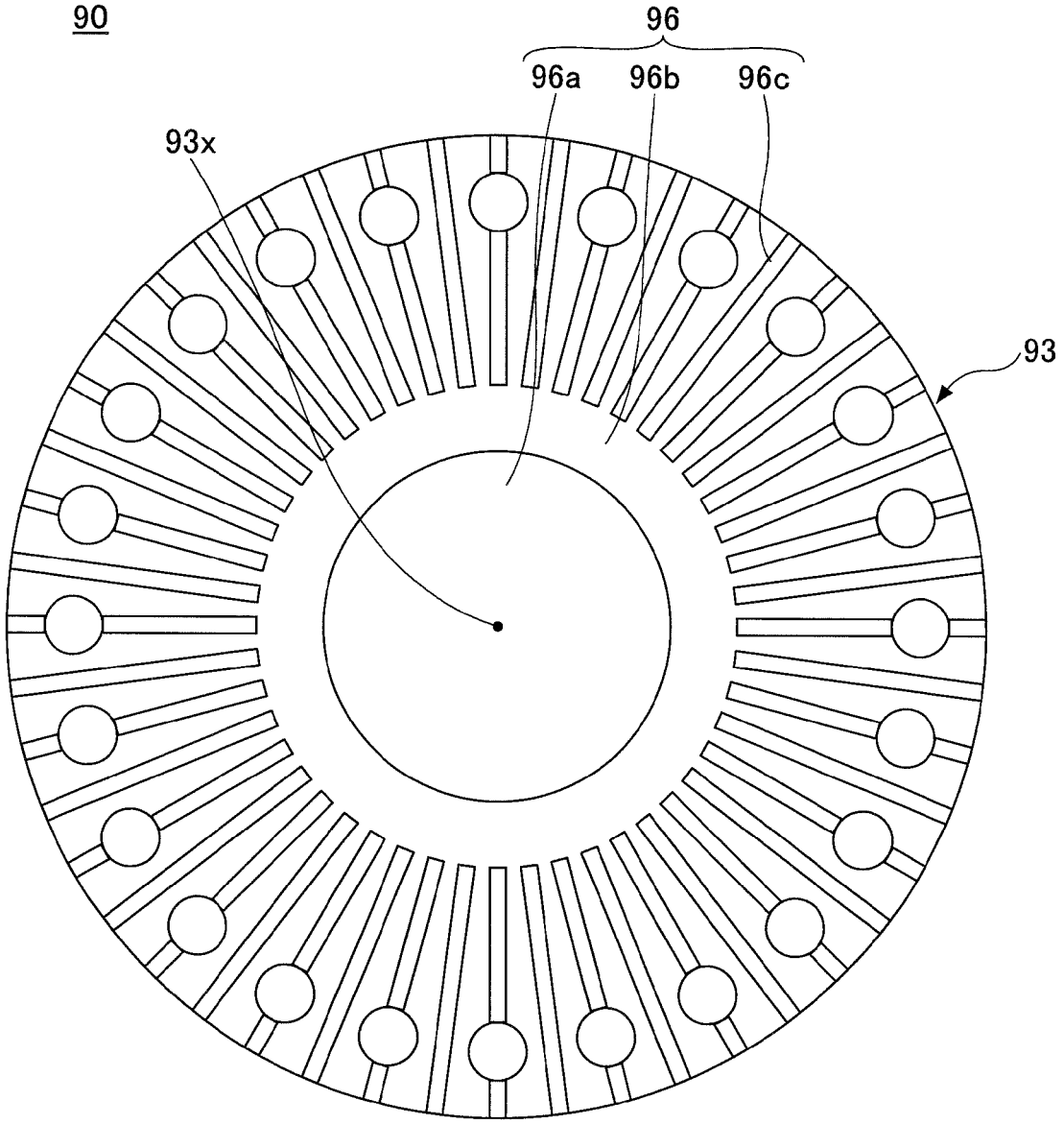
FIG. 17 is a partial plan view showing an example of the image projection apparatus of the second embodiment.

FIG. 13 is a perspective view showing an example of an image projection apparatus 90 of the second embodiment. FIG. 14 is a cross-sectional perspective view showing an example of the image projection apparatus 90 of the second embodiment. FIG. 15 is a cross-sectional view showing an example of the image projection apparatus 90 of the second embodiment. FIG. 16 is a partial plan view showing an example of the image projection apparatus 90 of the second embodiment where a radiation member 96 and an axial-flow fan 97 are not shown. FIG. 17 is a partial plan view showing an example of the image projection apparatus 90 of the second embodiment where the axial-flow fan 97 is not shown. FIG. 14 is a cross-sectional view taken along a line along a longitudinal direction of one of the fins 96c of the radiation member 96.

With reference to FIG. 13 to FIG. 17, the image projection apparatus 90 includes plural light sources $\mathbf{11}_1$ to $\mathbf{11}_{24}$, plural coupling lenses $\mathbf{12}_1$ to $\mathbf{12}_{24}$ (only a part of which is shown), a support member 93, reflecting mirrors 94, a reflecting mirror 95, a radiation member 96, an axial-flow fan 97, the rod integrator 17, the relay lens 18, the image forming panel 19 and the projector lens 20.

As the optical components at the downstream of the rod integrator 17 are the same as those of the first embodiment, those are not shown in FIG. 13 to FIG. 17. The structure composed by the plural light sources $\mathbf{11}_1$ to $\mathbf{11}_{24}$, the plural coupling lenses $\mathbf{12}_1$ to $\mathbf{12}_{24}$ and the reflecting unit 93c is an example of the light source apparatus.

The light source $\mathbf{11}_1$ to $\mathbf{11}_{24}$ are, for example, lasers such as semiconductor lasers or the like, respectively. In this embodiment, the colors of the irradiated lights from the light sources $\mathbf{11}_1$ to $\mathbf{11}_{24}$ may be the same or may be different. The coupling lenses $\mathbf{12}_1$ to $\mathbf{12}_{24}$ are convex lenses made of glass or plastics, for example, Hereinafter, a set of the light sources $\mathbf{11}_1$ to $\mathbf{11}_{24}$ and the coupling lenses $\mathbf{12}_1$ to $\mathbf{12}_{24}$ are referred to as a "first light source unit" as well.

The support member 93 is provided with a flat plate 93a, plural through holes 93b, a reflecting unit 93c and an inclined portion 93d. The flat plate 93a has a substantially circular shape in a planar view, for example. The support member 93 may be made of, for example, a metal such as aluminum, magnesium or the like, a mold resin or the like. The through holes 93b penetrating the flat plate 93a in the thickness direction are provided at the peripheral portion of the flat plate 93a at substantially even intervals along a circumference of the flat plate 93a.

Each pair of the light source and the coupling lens among the light sources $\mathbf{11}_1$ to $\mathbf{11}_{24}$ and the coupling lenses $\mathbf{12}_1$ to $\mathbf{12}_{24}$ is inserted in each of the through holes 93b. The pair of the light source and the coupling lens is inserted and fixed in the corresponding through hole 93b such that an optical axis (irradiating direction) of the light irradiated from the light source becomes substantially parallel in relationship with the thickness direction of the support member 93 (a center axis 93x of the circle formed by the plural through holes 93b). The distance between the adjacent light sources among the light sources $\mathbf{11}_1$ to $\mathbf{11}_{24}$ may be arbitrary determined by selecting the size of the support member 93, and may be about 10 to 15 mm, for example.

The reflecting mirrors 94 are respectively provided at one end side of the through holes 93b (at a side from which the lights are irradiated). It means that a reflecting mirror 94 is provided for each of the light sources. The reflecting mirrors 94 are supported at the inclined portion 93d formed at the peripheral portion of one surface of the support member 93 by adhesive, a flat spring or the like, for example. An angle of each of the reflecting mirrors 94 with respect to a light axis of the corresponding light source $\mathbf{11}_1$ to $\mathbf{11}_{24}$ may be 45°, for example. The reflecting mirror 94 is made of glass, and an aluminum layer may be deposited for the reflecting surface, for example.

The reflecting unit 93c is provided at the one surface (lower surface in FIG. 15) of the flat plate 93a at a substantial center portion. The reflecting unit 93c is formed to have a cone or pyramid shape provided with plural reflecting surfaces corresponding to the number of the light sources. In other words, each of the reflecting surfaces of the reflecting unit 93c is provided at a position where the irradiated light from the corresponding light source $\mathbf{11}_1$ to $\mathbf{11}_{24}$ via the corresponding coupling lens $\mathbf{12}_1$ to $\mathbf{12}_{24}$ and the reflecting mirror 94 is injected. An angle of each of the reflecting surfaces of the reflecting unit 93c with respect to an optical axis of the corresponding light source $\mathbf{11}_1$ to $\mathbf{11}_{24}$ may be 30°, for example.

The reflecting unit 93c may be made of the same material as that of the reflecting mirrors 94. The reflecting unit 93c is supported at an inclined surface provided at the substantial center portion of the one surface of the flat plate 93a by adhesive, a flat spring or the like, for example. Alternatively, when the support member 93 is made of a metal, the reflecting unit 93c may be composed by forming the inclined surface provided at the substantial center portion of the one surface of the flat plate 93a to be a mirror finished surface.

The lights irradiated from the light sources $\mathbf{11}_1$ to $\mathbf{11}_{24}$ pass through the respective coupling lenses $\mathbf{12}_1$ to $\mathbf{12}_{24}$ and become beams substantially parallel in relationship with each other in a bit of a condensed state. The lights passed through the coupling lenses $\mathbf{12}_1$ to $\mathbf{12}_{24}$ are reflected by the respective reflecting mirrors 94 so that their optical paths are changed substantially 90° to be directed to the center (toward the center axis 93x) of the circle and injected into the respective reflecting surfaces of the reflecting unit 93c.

Then, the lights injected into the reflecting surfaces of the reflecting unit 93c are reflected to be a bit inclined with respect to the center axis 93x and injected into the reflecting mirror 95. Here, a reflecting prism may be used instead of the reflecting mirror 95. The reflecting mirror 95 may be made of the same material as that of the reflecting mirrors 94. Each of the reflecting surfaces of the reflecting unit 93c are provided to be inclined such that the lights reflected by the reflecting mirror 95 are gathered at a spot of an input portion of the rod integrator 17.

The reflecting mirror 95 introduces all of the lights respectively reflected by the reflecting surfaces of the reflecting unit 93c in a horizontal direction so that the image projection apparatus 90 can be formed thinner. However, when it is not necessary for the image projection apparatus to be formed thinner, similar to the alternative example 3 of the first embodiment, the reflecting mirror 95 may be not provided. As the optical components at the downstream of the rod integrator 17 are the same as those of the first embodiment, explanations are not repeated.

The radiation member 96 is provided at the other surface of the flat plate 93a of the support member 93 (the surface where the reflecting unit 93c is not formed). Further, the axial-flow fan 97 is provided on the radiation member 96. The radiation member 96 and the axial-flow fan 97 may be provided in accordance with necessity. In the drawings, blade portions of the axial-flow fan 97 which rotate are not shown.

The radiation member 96 is provided with a flat surface 96a, a guide surface 96b and plural fins 96c. The radiation member 96 has a substantially circular shape in a planar view. The radiation member 96 is made of, for example, a material having good heat conductivity such as copper, aluminum or the like. In this example, as the center of the axial-flow fan 97 is not opened, the radiation member 96 has the corresponding structure. In this embodiment, the flat surface 96a is provided at the center of the radiation member 96, and the center portion of the axial-flow fan 97 is attached to the flat surface 96a.

The periphery of the flat surface 96a is concaved downward which becomes deeper the closer to the outer periphery of the radiation member 96 to form the guide surface 96b. The guide surface 96b (or concave portion) has a function to introduce air from the axial-flow fan 97 toward the outer periphery of the radiation member 96. In this embodiment, the guide surface 96b has a curved shape in a cross-sectional view. Alternatively, the guide surface 96b may have a linear shape in a cross-sectional view. Even in such a case, the same merit can be obtained. In other words, the guide surface 96b may have a circular conic surface.

The plural fins 96c are radially provided to stand at the outer part of the guide surface 96b at substantially even intervals. There area first kind of fin 96c in which the light source is fixed, and a second kind of fin 96c in which the light source is not fixed, which are alternately provided in a circular direction. In other words, the first kind of fin 96c is provided on a line extending on the corresponding light source in a planar view and the second kind of fin 96c is provided on a line extending between the corresponding light sources. The first kind of fin 96c is provided with an opening portion to accept the corresponding light source. Here, one surface of the radiation member 96 (the lower surface in FIG. 14) contacts the support member 93. At the other surface of the radiation member 96, the fins 96c are provided such that the ends of the fins 96c are positioned at substantially the same plane as the flat surface 96a.

As shown in FIG. 17, in this example, the fins 96c are provided in radial, however, the design of the fins 96c are not limited so. For example, the fins 96c may be inclined with respect to the radius of the circle defined by the outer periphery of the radiation member to be in a planner view shown in FIG. 17. Further, each of the fins 96c is formed to have a straight line shape in a planner view in this example. Alternatively, each of the fins 96c may be formed to have a curved line shape in a planner view. It means that the fins 96c are designed arbitrary to be optimized in accordance with air flow from the axial-flow fan 97.

According to the image projection apparatus 90 of the second embodiment, plural sets of the laser and the coupling lens corresponding to the laser are circumferentially provided such that the optical axes of the lights irradiated from the light sources are directed in the width direction of the support member. Here, the light sources are provided at the peripheral portion of the support member and the width direction of the support member is in a parallel relationship with the center axis of the support member. Thus, according to the image projection apparatus of the second embodiment, the following merits can also be obtained in addition to the merits obtained in the first embodiment.

For the second embodiment, the support member may be easily formed by molding using a die or a mold as the drawing direction is the same. Therefore, the cost can be reduced for manufacturing the support member.

Further, by providing the radiation member provided with the guide surface and fins having a shape easily passing air on the support member, efficient cooling can be performed.

Here, the width direction of the support member means not only the direction which is strictly perpendicular to the surface which is in contact with the radiation member. The width direction of the support member includes a direction which is a bit inclined with respect to the direction which is completely perpendicular to the surface as long as the same merits of the embodiment can be obtained.

Alternative Example 1 of the Second Embodiment

In an alternative example 1 of the second embodiment, the plural light source units are provided as concentric circles. In the alternative example 1 of the second embodiment, explanation of the same components which are already explained is not repeated.

Figure 18:
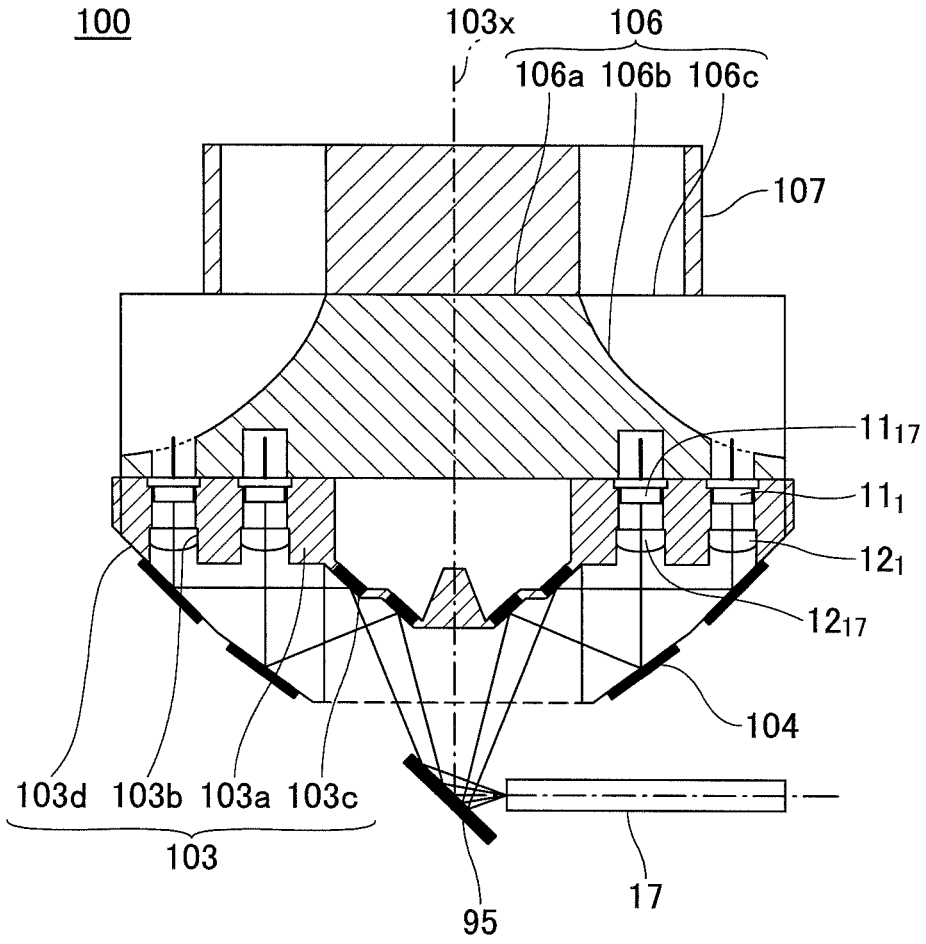
FIG. 18 is a cross-sectional view showing an image projection apparatus of an alternative example 1 of the second embodiment.
Figure 19:
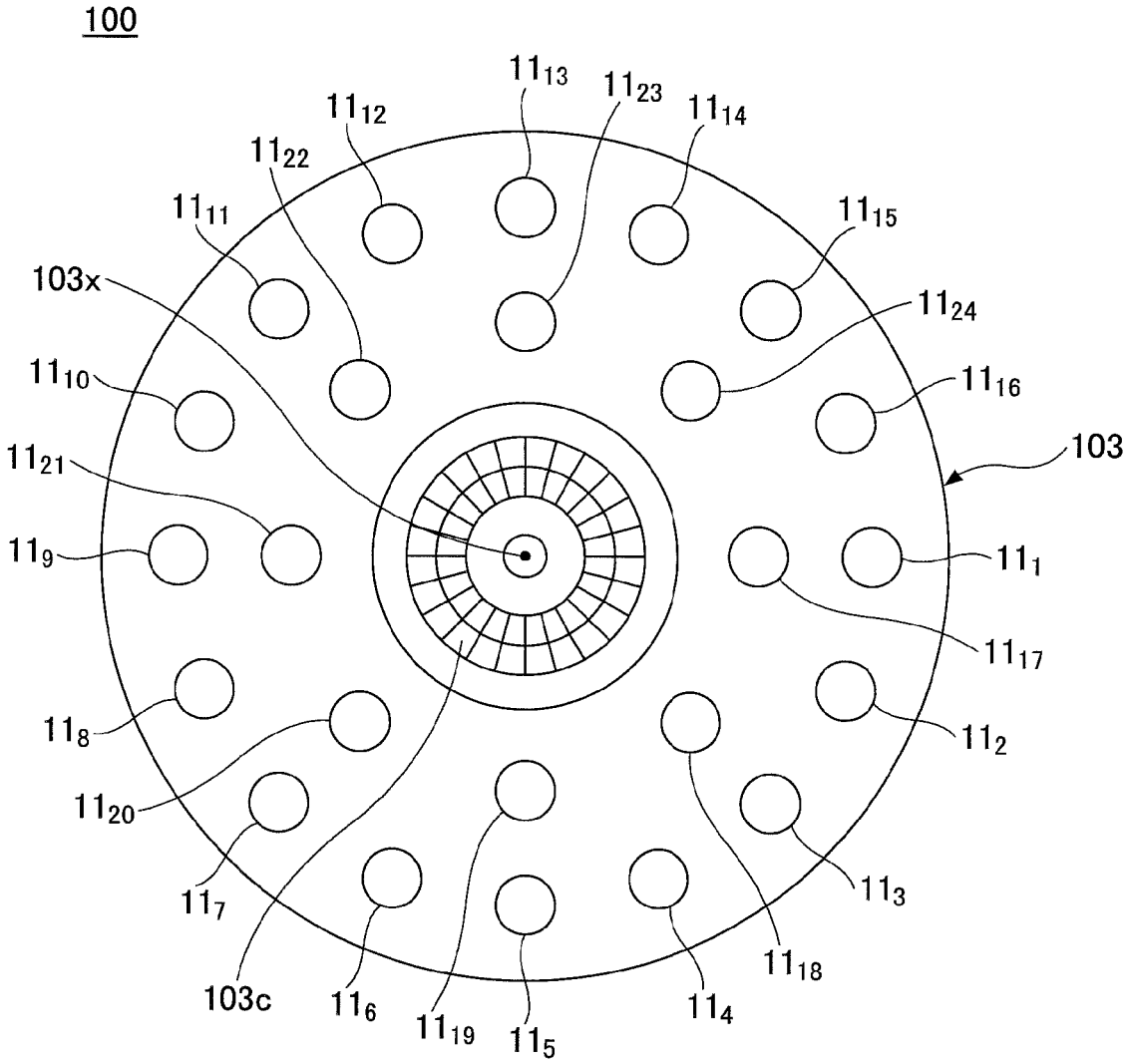
FIG. 19 is a partial plan view showing an example of the image projection apparatus of the alternative example 1 of the second embodiment.

FIG. 18 is a cross-sectional view showing an image projection apparatus 100 of the alternative example 1 of the second embodiment. FIG. 19 is a partial plan view showing an example of the image projection apparatus 100 of the alternative example 1 of the second embodiment where a radiation member 106 and an axial-flow fan 107 are not shown.

With reference to FIG. 18 and FIG. 19, the image projection apparatus 100 includes plural light sources $\mathbf{11}_1$ to $\mathbf{11}_{24}$, plural coupling lenses $\mathbf{12}_1$ to $\mathbf{12}_{24}$ (only a part of which are shown), a support member 103, reflecting mirrors 104, the reflecting mirror 95, the radiation member 106, the axial-flow fan 107, the rod integrator 17, the relay lens 18, the image forming panel 19 and the projector lens 20.

As the optical components at the downstream of the rod integrator 17 are the same as those of the first embodiment, those are not shown in FIG. 18 and FIG. 19. The structure composed by the plural light sources $\mathbf{11}_1$ to $\mathbf{11}_{24}$, the plural coupling lenses $\mathbf{12}_1$ to $\mathbf{12}_{24}$ and the reflecting unit 103c is an example of the light source apparatus.

In the alternative example 1 of the second embodiment, a first light source unit including the light sources $\mathbf{11}_1$ to $\mathbf{11}_{16}$ and the coupling lenses $\mathbf{12}_1$ to $\mathbf{12}_{16}$ and a second light source unit including the light sources $\mathbf{11}_{17}$ to $\mathbf{11}_{24}$ and the coupling lenses $\mathbf{12}_{17}$ to $\mathbf{12}_{24}$ are provided at the support member 103 as concentric circles in a planar view. The light sources $\mathbf{11}_1$ to $\mathbf{11}_{16}$ and the coupling lenses $\mathbf{12}_1$ to $\mathbf{12}_{16}$ form an outer annulus (outer circle) having a center axis 103x as the center of the outer circle, and the light sources $\mathbf{11}_{17}$ to $\mathbf{11}_{24}$ and the coupling lenses $\mathbf{12}_{17}$ to $\mathbf{12}_{24}$ form an inner annulus (inner circle) having the center axis 103x as the center of the inner circle.

Similar to the support member 93, the support member 103 is provided with a flat plate 103a, plural through holes 103b, a reflecting unit 103c and an inclined portion 103d. The flat plate 103a has a substantially circular shape in a planar view, for example. For the flat plate 103a, explanations of the through holes 103b, the reflecting unit 103c and the inclined portion 103d, that function the same as the flat plate 93a, the through holes 93b, the reflecting unit 93c and the inclined portion 93d are not repeated, and only the different part is explained in the following.

The through holes 103b, the reflecting surfaces of the reflecting unit 103c, and the reflecting mirrors 104 are provided as concentric double circles respectively corresponding to the light sources which are positioned to be the concentric double circles in a planar view. In the image projection apparatus 100, the light sources of the same number as those of the image projection apparatus 90 may be provided as the concentric double circles in a planar view. Therefore, the size of the support member 103 may be made smaller than that of the support member 93 in a planar view.

The radiation member 106 is provided at the other surface of the flat plate 103a of the support member 103 (the surface where the reflecting unit 103a is not formed). Further, the axial-flow fan 107 is provided on the radiation member 106. However, the radiation member 106 and the axial-flow fan 107 may be provided in accordance with necessity. In the drawings, blade portions of the axial-flow fan 107 which rotate are not shown.

Similar to the radiation member 96, the radiation member 106 is provided with a flat surface 106a, a guide surface 106b and plural fins 106c. The radiation member 106 has a substantially circular shape in a planar view. The radiation member 106 is similarly formed as the radiation member 96 except that the radius of which is smaller than that of the radiation member 96 in a planar view corresponding to the support member 103. Similarly, the axial-flow fan 107 is formed similarly as the axial-flow fan 97 except that the radius of which is smaller than that of the axial-flow fan 97 in a planar view corresponding to the support member 103.

Here, by setting the number of the light sources of the inner circle and the light sources of the outer circle to be the same, each of the reflecting mirrors 103c can be commonly provided for each set of the light sources of the inner circle and the outer circle. Further, by alternately positioning the light sources of the inner circle and the light sources of the outer circle in a zigzag manner, the difference in radius of the inner circle and the outer circle can be made smaller. In other words, the distance between the inner circle and the outer circle can be made shorter so that the size of the radiation member 106 can be further made smaller. Further for the case shown in FIG. 18, the light sources of the inner circle and the light sources of the outer circle are provided at the same height. However, the light sources of the inner circle and the light sources of the outer circle may be positioned at the different heights to have the length of the optical paths constant.

According to the image projection apparatus of the alternative example 1 of the second embodiment, the plural light source units are provided as concentric circles. Therefore, according to the example, the following merits can be also obtained in addition to the merits obtained in the second embodiment.

The size of the support member can be made smaller compared with that of the second embodiment, for example, by setting the number of the light sources in the inner and outer circles the same. Therefore, the size of the light source apparatus and the image projection apparatus can be made smaller.

Alternative Example 2 of the Second Embodiment

In an alternative example 2 of the second embodiment, a radiation member and a fan different from those of the second embodiment are used. In the alternative example 2 of the second embodiment, explanation of the same components which are already explained is not repeated.

Figure 20:
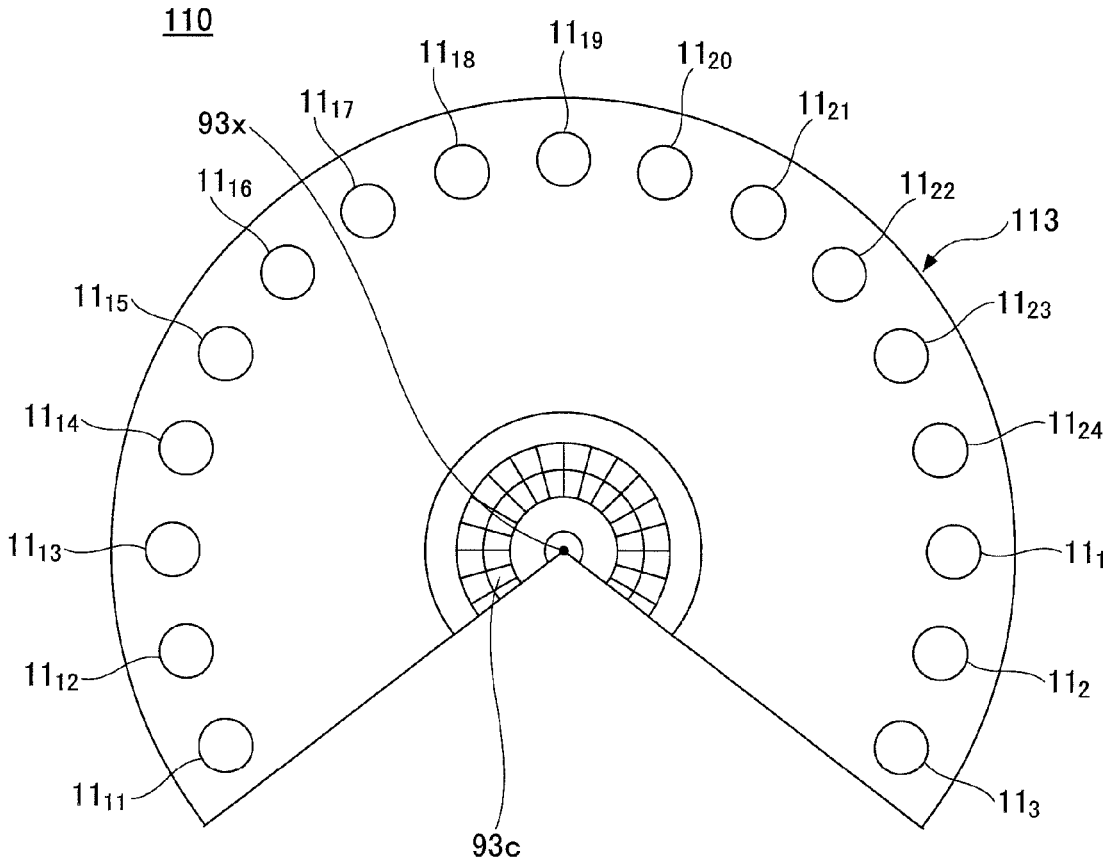
FIG. 20 is a partial plan view showing an example of an image projection apparatus of an alternative example 2 of the second embodiment.
Figure 21:
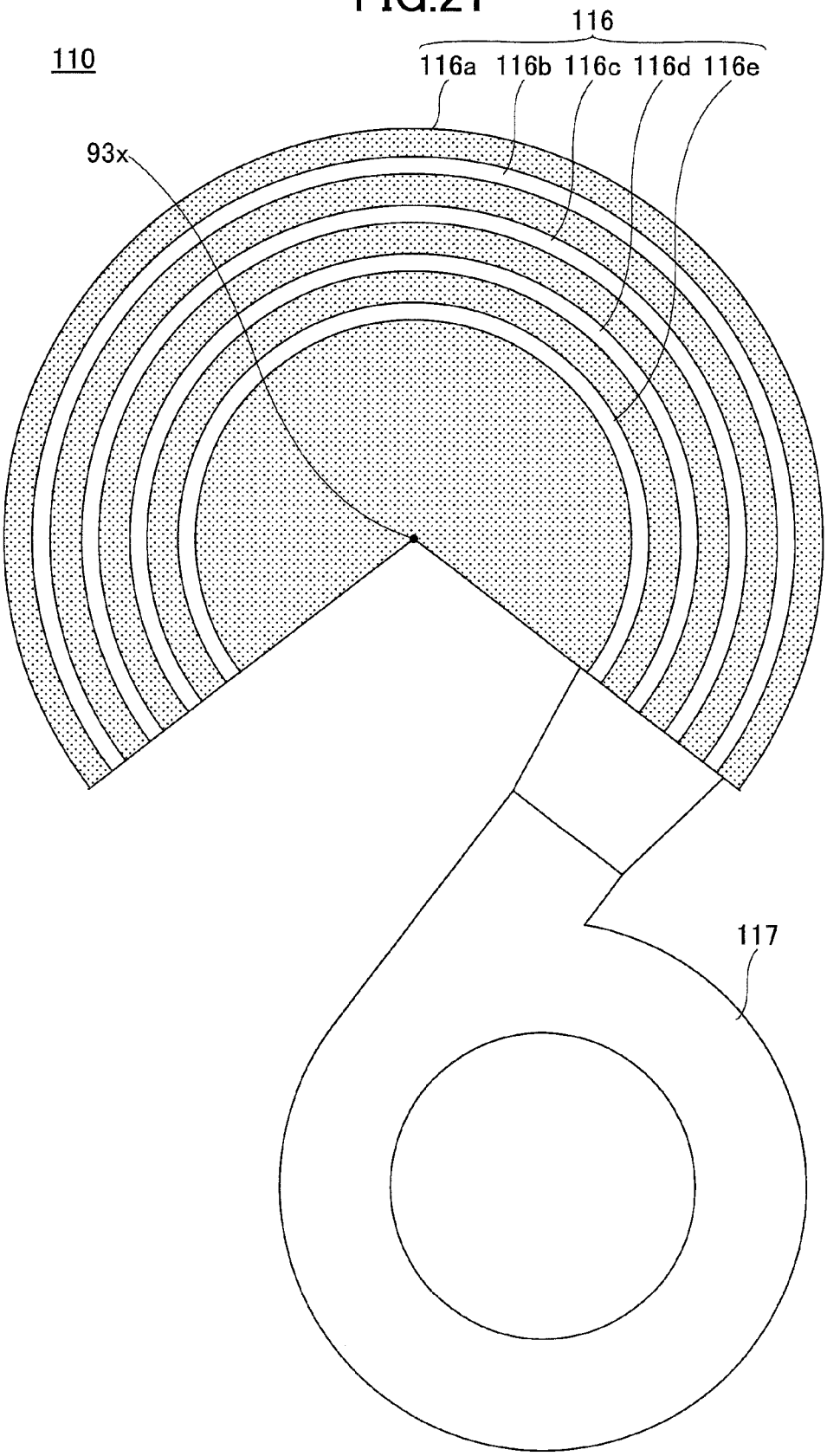
FIG. 21 is a plan view showing an example of the image projection apparatus of the alternative example 2 of the second embodiment.

FIG. 20 is a partial plan view showing an example of an image projection apparatus 110 of an alternative example 2 of the second embodiment. In FIG. 20, a radiation member 116 and a sirocco fan 117 are not shown. FIG. 21 is a plan view showing an example of the image projection apparatus 110 of the alternative example 2 of the second embodiment.

With reference to FIG. 20 and FIG. 21, in the image projection apparatus 110, the support member 113 is provided with a notch portion obtained by removing a part, having a fan shape, of the support member 93, shown in FIG. 16 or the like. The light sources, the coupling lenses and the like are only circumferentially formed at the rest part (a part of circle) of the support member 113. In other words, the light sources $11_4$ to $11_{10}$ and the corresponding coupling lenses and the reflecting mirrors shown in FIG. 16 are not provided in this example.

The radiation member 116 is placed on the support member 113. In this example, the radiation member 116 is also provided with a notch portion same as that of the support member 113. Further, the radiation member 116 is provided with channels 116b, 116c, 116d, and 116e of concentric circles at the rest part of the circular plate 116a. The number of channels, the width of each of the channels and the like are arbitrary determined. Although not shown in the drawings, a cover having the same shape as the circular plate 116a, for example, is provided on the circular plate 116a to form the channels 116b, 116c, 116d, and 116e into tunnels.

The sirocco fan 117 is provided at one end side of the tunnel channels 116b, 116c, 116d, and 116e. Air introduced from the sirocco fan 117 passes through the channels 116b, 116c, 116d, and 116e while absorbing heat generated by the light sources to be output at the other end side of the tunnel channels 116b, 116c, 116d, 116e.

Figure 22:
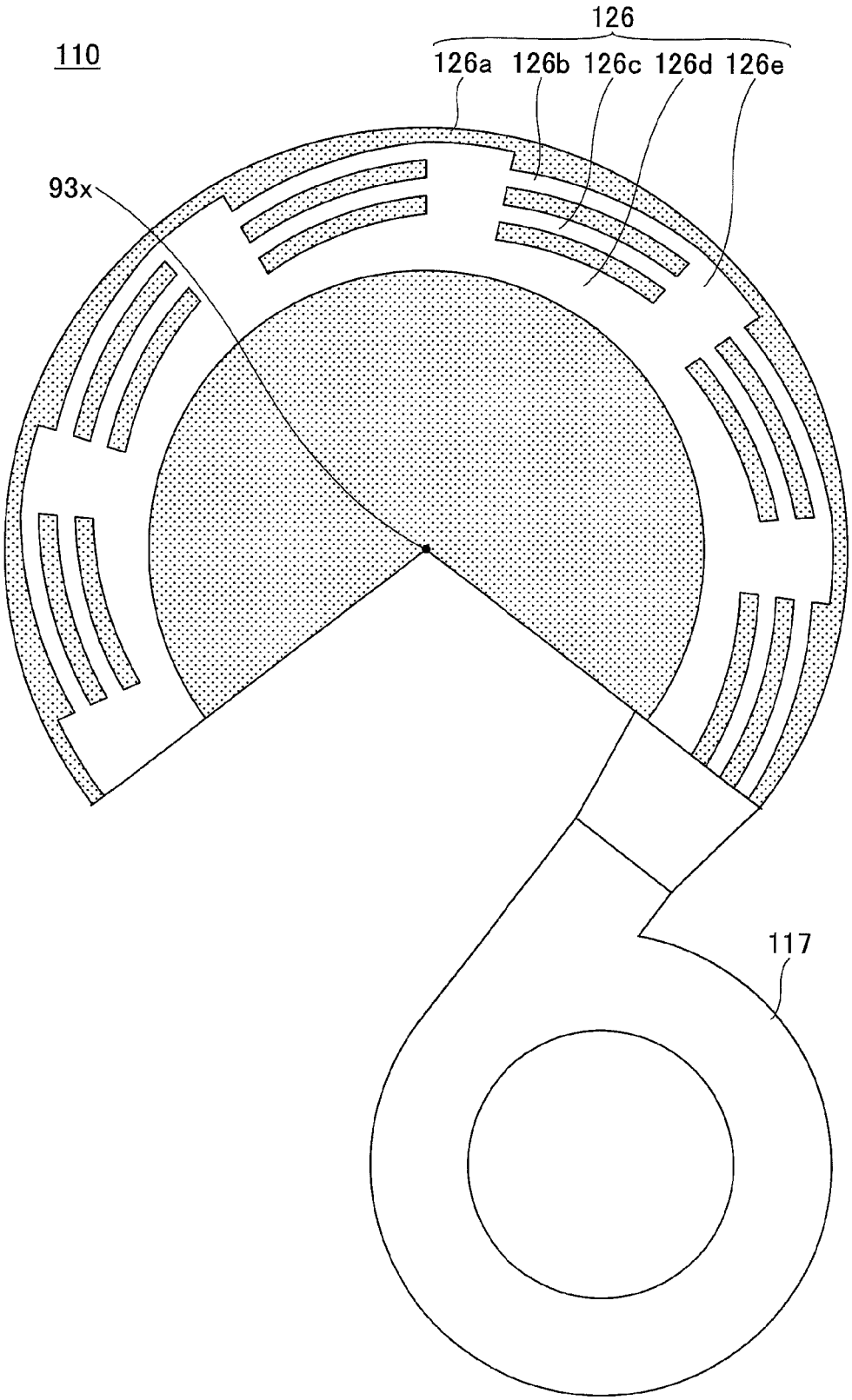
FIG. 22 is a plan view showing another embodiment of an image projection apparatus of the alternative example 2 of the second embodiment.

The radiation member 116 shown in FIG. 21 may be substituted by a radiation member 126 shown in FIG. 22. In the radiation member 126, channels 126b, 126c, and 126d are partially provided as substantially concentric circles which are connected by channels 126e provided to extend in a radius direction of the circular plate 126a. In order to efficiently pass air through from the sirocco fan 117, the channels 126b and 126c may be shifted a bit from the concentric circles. The number of channels, the width of the channels, and the like may be arbitrary determined.

Further, although not shown in the drawings, the cover having the same shape as the circular plate 116a, for example, is provided on the circular plate 116a to form the channels 116b, 116c, 116d, and 116e into tunnels.

The shape or the kind of the radiation member and the fan placed on the support member may be arbitrary determined. Further, the shape of the support member may be changed in accordance with the shape of the radiation member.

The present invention is not limited to the specifically disclosed embodiments, and variations and modifications may be made without departing from the scope of the present invention.

For example, in the embodiments and their alternative examples, the optical system including the transmission panel is shown at the downstream of the rod integrator, however, the optical system is not limited to the optical system including the transmission panel, and any other various optical systems suitable for a projector may be used.

Further, in the embodiments and their alternative examples, the number of light sources, amount of paralleling the lights by the coupling lens, amount of directing the lights by the reflecting unit, the distance between the optical elements, the size or the angle of the rod integrator, or the like may be arbitrary determined.

Further, for the second embodiment and its alternative examples 1 and 2, the same alternation as that of the alternative examples of the first embodiment can be applied.

Although in the above embodiment, it is described that the rod integrator 17 or the tapered rod integrator 67 are an example of the amount of light equation unit, in other words, the amount of light equation unit may also referred to as a beam combining unit that combines the light beams reflected by the reflecting surfaces of the light source apparatus.

According to the embodiments, a light source apparatus, and an image projection apparatus including the light source apparatus for projecting an enlarged image light source capable of using plural lasers while improving the heat radiation can be provided.

The present application is based on Japanese Priority Application No. 2011-136605 filed on Jun. 20, 2011 and on Japanese Priority Application No. 2011-289717 filed on Dec. 28, 2011, the entire contents of which are hereby incorporated herein by reference.

What is claimed is:

[1. A light source apparatus comprising:

a light source unit that includes plural sets of a laser and a coupling lens corresponding to the laser, which are circumferentially provided to form a circle;

a reflecting unit placed within the circle and provided with plural reflecting surfaces corresponding to the lasers of the plural sets of the light source unit to be formed in a cone shape, the light irradiated from each of the lasers being injected into the corresponding reflecting surface via the corresponding coupling lens;

a support member on which the lasers and the coupling lenses of the plural sets are fixed; and a radiation member provided at a surface of the support member opposite to the side where the light paths of the lights irradiated from the lasers of the sets are formed, and including a flat surface formed at a center portion, a sloped guide surface which is provided at the outer side of the flat surface to be concaved downward such as to become deeper the closer the sloped guide surface becomes to an outer periphery of the radiation member from the flat surface, and plural fins provided to rest on the concaved sloped guide surface.]

[2. The light source apparatus according to claim 1, further comprising:

a plurality of the light source units, wherein the plurality of light source units and the reflecting unit are fixed on the support member such that the lights irradiated from the lasers of the plurality of light source units are injected into the respective reflecting surfaces of the reflecting unit.]

[3. The light source apparatus according to claim 2, wherein the sets of the laser and the coupling lens of one of the light source units and the sets of the laser and the coupling lens of another of the light source units are alternately positioned in a planar view.]

[4. The light source apparatus according to claim 2, wherein the plurality of light source units are positioned on different levels, and wherein the sets of the laser and the coupling lens of the plurality of light source units are arranged around the circumference of the same circle in a planar view.]

[5. The light source apparatus according to claim 1, wherein the lasers and the coupling lenses of the plural sets are positioned such that optical axes of the irradiated lights from the lasers are directed in a thickness direction of the support member.]

[6. The light source apparatus according to claim 5, further comprising:

plural reflecting mirrors provided to change the optical paths of the lights irradiated from the respective lasers and passed through the coupling lenses toward the respective reflecting surfaces of the reflecting unit.]

[7. An image projection apparatus, comprising:

the light source apparatus according to claim 1;

an amount of light equation unit that equates the amount of the lights reflected by the reflecting surfaces of the reflecting unit of the light source apparatus;

a light transmission optical system that transmits the lights output from the amount of light equation unit to an image forming panel which forms an image; and a projection optical system that projects an enlarged image of the image formed on the image forming panel.]

[8. The image projection apparatus according to claim 7, further comprising:

a plurality of the light source apparatuses, wherein the lights irradiated from the light source units and reflected by the respective reflecting surfaces of the reflecting units of the light source apparatuses are injected into the amount of light equation unit.]

[9. The image projection apparatus according to claim 7, further comprising:

a diffusion unit that diffuses the lights.]

*10. A light source apparatus comprising:*

*a light source unit that includes plural sets of a laser and a coupling lens corresponding to the laser, which are circumferentially provided to form a circle;*

*a reflecting unit placed within the circle and provided with plural reflecting surfaces corresponding to the lasers of the plural sets of the light source unit, the light irradiated from each of the lasers being injected into the corresponding reflecting surface via the corresponding coupling lens;*

*a support member on which the lasers and the coupling lenses of the plural sets are fixed, the lasers and the coupling lenses of the plural sets being positioned such that optical axes of the irradiated lights from the lasers are directed in a thickness direction of the support member;*

*a reflecting mirror provided to change the optical paths of the lights irradiated from the lasers and passed through the coupling lenses toward the respective reflecting surfaces of the reflecting unit; and*

*a radiation member provided at a surface of the support member opposite to the side where the light paths of the lights irradiated from the lasers of the sets are formed.*

*11. The light source apparatus according to claim 10, further comprising:*

*a plurality of light source units,*

*wherein the light source units and the reflecting unit are fixed on the support member such that the lights irradiated from the lasers of the light source units are injected into the respective reflecting surfaces of the reflecting unit.*

*12. The light source apparatus according to claim 11,*

*wherein the sets of the laser and the coupling lens of one of the light source units and the sets of the laser and the coupling lens of another of the light source units are alternately positioned in a planar view.*

*13. The light source apparatus according to claim 10, wherein the radiation member includes a flat surface formed at a center portion, a guide surface which is provided at the outer side of the flat surface to be concaved from the flat surface, and plural fins provided to be stand at the guide surface.*

*14. A light source apparatus comprising:*

*a light source unit that includes plural sets of a laser and a coupling lens corresponding to the laser, which are circumferentially provided to form a circle;*

*a reflecting unit placed within the circle and provided with plural reflecting surfaces corresponding to the lasers of the plural sets of the light source unit, the light irradiated from each of the lasers being injected into the corresponding reflecting surface via the corresponding coupling lens;*

*a support member on which the lasers and the coupling lenses of the plural sets are fixed, the lasers and the coupling lenses of the plural sets being positioned such that optical axes of the irradiated lights from the lasers are directed in a thickness direction of the support member;*

*a reflecting mirror provided to change the optical paths of the lights irradiated from the lasers and passed through the coupling lenses toward the respective reflecting surfaces of the reflecting unit; and*

*a radiation member provided at a surface of the support member opposite to the side where the light paths of the lights irradiated from the lasers of the sets are formed, and provided with a channel.*

*15. An image projection apparatus, comprising:*

*the light source apparatus according to claim 10;*

*an amount of light equation unit that equates the amount of the lights reflected by the reflecting surfaces of the reflecting unit of the light source apparatus;*

*a light transmission optical system that transmits the lights output from the amount of light equation unit to an image forming panel which forms an image; and*

*a projection optical system that projects an enlarged image of the image formed on the image forming panel.*

*16. The image projection apparatus according to claim 15, further comprising:*

*a plurality of light source apparatuses,*

*wherein the lights irradiated from the light source units and reflected by the respective reflecting surfaces of the reflecting units of the light source apparatuses are injected into the amount of light equation unit.*

*17. The image projection apparatus according to claim 15, further comprising:*

*a diffusion unit that diffuses the lights.*

* * * * *